US009402268B2

(12) United States Patent
Taori et al.

(10) Patent No.: US 9,402,268 B2
(45) Date of Patent: Jul. 26, 2016

(54) TRANSMISSION AND SCHEDULING SCHEMES FOR WIRELESS FRONTHAUL

(71) Applicant: Samsung Electronics Co., Ltd., Suwon-si, Gyeonggi-do (KR)

(72) Inventors: Rakesh Taori, McKinney, TX (US); Arun Sridharan, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 14/177,169

(22) Filed: Feb. 10, 2014

(65) Prior Publication Data

US 2015/0036571 A1 Feb. 5, 2015

Related U.S. Application Data

(60) Provisional application No. 61/861,905, filed on Aug. 2, 2013.

(51) Int. Cl.
*H04W 72/12* (2009.01)
*H04W 52/02* (2009.01)

(52) U.S. Cl.
CPC ...... *H04W 72/1278* (2013.01); *H04W 52/0235* (2013.01)

(58) Field of Classification Search
None
See application file for complete search history.

(56) References Cited

U.S. PATENT DOCUMENTS

| 2011/0280163 | A1* | 11/2011 | Haustein et al. ............... 370/280 |
| 2012/0020319 | A1* | 1/2012 | Song et al. ................... 370/330 |
| 2012/0063383 | A1 | 3/2012 | Barbieri et al. |
| 2013/0155847 | A1 | 6/2013 | Li et al. |

FOREIGN PATENT DOCUMENTS

| KR | 10-2012-0060922 A | 6/2012 |
| KR | 10-2012-0119216 A | 10/2012 |
| WO | WO 2013-058607 A1 | 4/2013 |

OTHER PUBLICATIONS

International Search Report dated Nov. 13, 2014 in connection with International Patent Application No. PCT/KR2014/007046, 3 pages.
Written Opinion of International Searching Authority dated Nov. 13, 2014 in connection with International Patent Application No. PCT/KR2014/007046, 6 pages.

* cited by examiner

*Primary Examiner* — Chi H Pham
*Assistant Examiner* — Shick Hom

(57) ABSTRACT

A communication system includes a plurality of eNodeBs (eNBs) configured to serve one or more user equipments (UEs). The plurality of eNBs includes a first eNB and a second eNB. The first eNB is configured to wirelessly communicate on a resource with the second eNB. The resource includes a time resource and/or a frequency resource. The first and second eNBs are configured to cooperatively serve the one or more UEs. The first and second eNBs are configured to engage in wireless communication following a predetermined schedule known to the plurality of eNBs.

17 Claims, 32 Drawing Sheets

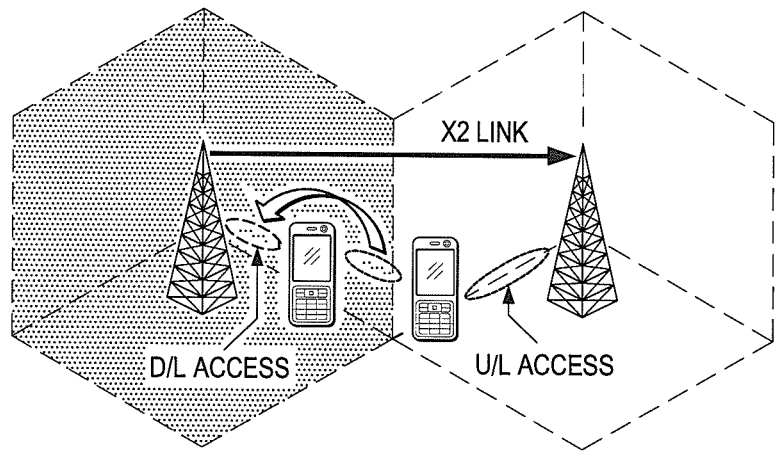
FIG. 8
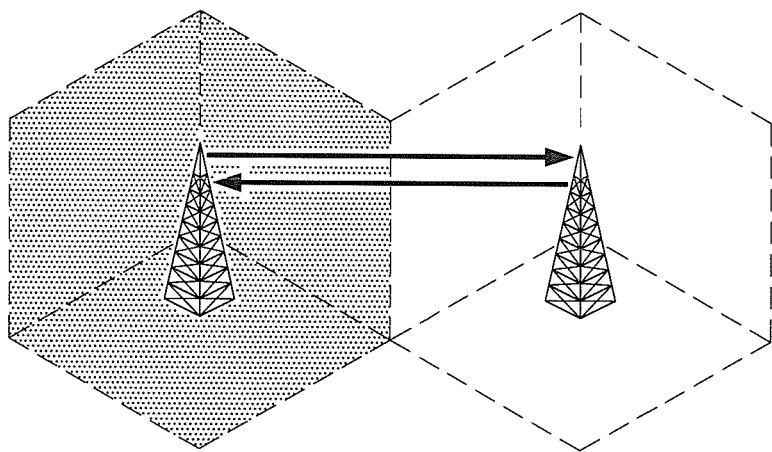
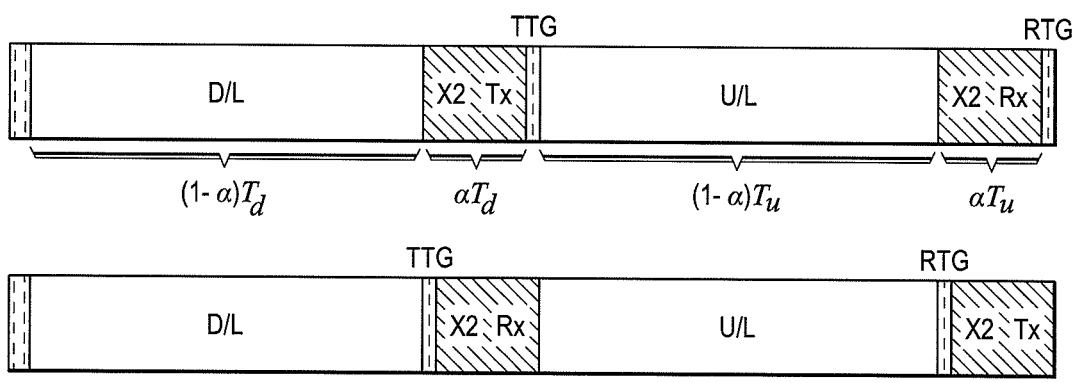
FIG. 9

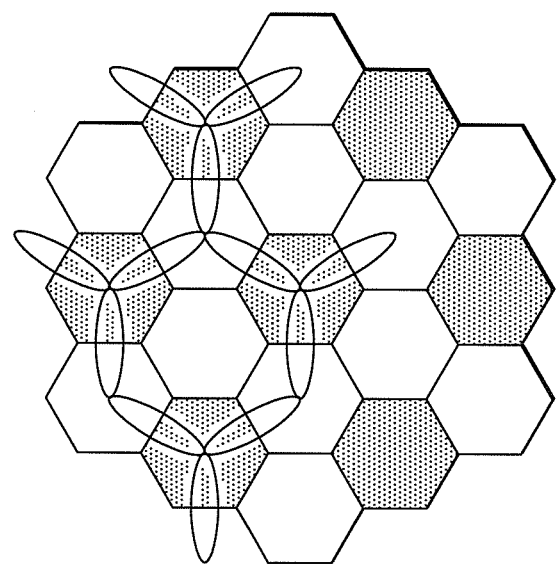
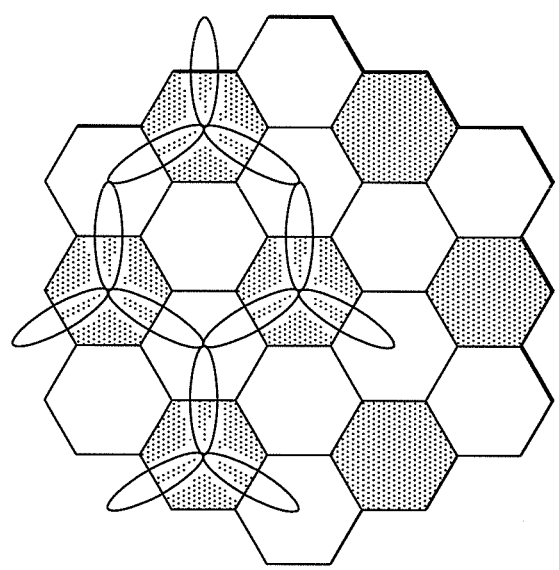
FIG. 12A

FIG. 22

WE DESIGNATE ONE OR MORE TIME SLOTS IN A SUBFRAME IN WHICH DESIGNATED GROUPS OF BSs PERFORM BACKHAUL AS CLAIMED PREVIOUSLY AND:

SOME TRANSMISSIONS MAY CONSIST OF BACKHAULING DATA, WHILE AT THE SAME TIME SOME TRANSMISSIONS MAY CONSIST OF CONTROL MESSAGE EXCHANGES ON THE FRONTHAUL WHILE SOME OTHER TRANSMISSIONS MAY CONSIST OF BOTH CONTROL MESSAGES AND BACKHAUL DATA. THESE CONTROL MESSAGES MAY BE COMPOSED OF:

➢ ACCESS LINK QUALITY INFORMATION
➢ USER RELATED DATA
➢ SCHEDULING MAPS

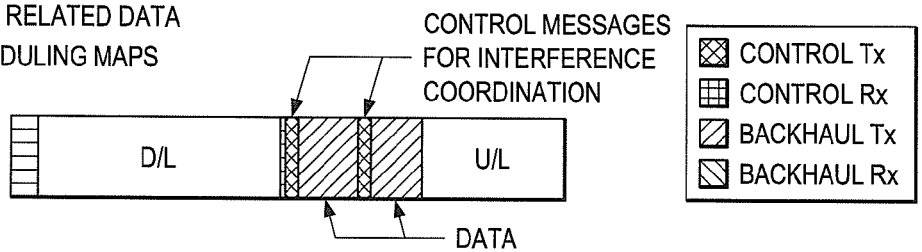

FIG. 23

A DESIGNATED GROUP OF BSs ENGAGE IN POINT-TO-POINT BACKHAUL TRANSMISSIONS TO ANOTHER DESIGNATED GROUP OF BSs IN WHICH:

➢ A WIRELESS X2 INTERFACE IS USED FOR TRANSMISSION OF BACKHAUL DATA BETWEEN THE BSs

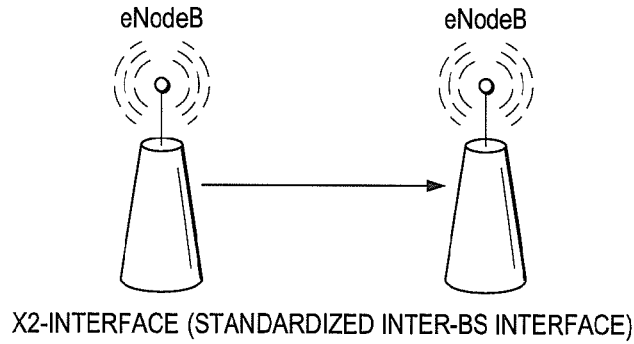

X2-INTERFACE (STANDARDIZED INTER-BS INTERFACE)

TRANSMISSION AND SCHEDULING SCHEMES FOR WIRELESS FRONTHAUL

CROSS-REFERENCE TO RELATED APPLICATION AND CLAIM OF PRIORITY

This application claims priority under 35 U.S.C. §119(e) to U.S. Provisional Patent Application No. 61/861,905 filed on Aug. 2, 2013. The above-identified provisional patent application is hereby incorporated by reference in its entirety.

TECHNICAL FIELD

This disclosure relates generally to wireless communication systems and, more specifically, to transmission and scheduling schemes for wireless fronthaul.

BACKGROUND

Future generations of cellular communication systems can be expected to increase in density with ever-increasing numbers of "small cell" deployments. As cellular systems become increasingly more dense, the cost of bringing fiber to "small cell" deployments can become prohibitively expensive. For future generations of cellular systems, planning high-capacity backhaul links from base stations or other eNodeBs to core networks poses a challenge.

SUMMARY

This disclosure provides transmission and scheduling schemes for wireless fronthaul.

In a first embodiment, a communication system includes a plurality of eNodeBs (eNBs) configured to serve one or more user equipments (UEs). The plurality of eNBs includes a first eNB and a second eNB. The first eNB is configured to wirelessly communicate on a resource with the second eNB. The resource includes a time resource and/or a frequency resource. The first and second eNBs are configured to cooperatively serve the one or more UEs. The first and second eNBs are configured to engage in wireless communication following a predetermined schedule known to the plurality of eNBs.

In a second embodiment, a method for use in a communication system having a plurality of eNodeBs (eNBs) including a first eNB and a second eNB is disclosed. The method includes receiving, by the plurality of eNBs, a predetermined schedule for wireless data communication between at least the first eNB and the second eNB. The method also includes wirelessly communicating data between the first eNB and the second eNB over a resource based on the predetermined schedule. The resource includes a time resource and/or a frequency resource. At least the first eNB and the second eNB are configured to cooperatively serve one or more user equipments (UEs).

In a third embodiment, an apparatus includes an eNodeB (eNB). The eNB includes one or more wireless transceivers configured to wirelessly communicate with one or more other eNBs via one or more antennas. The eNB also includes processing circuitry. The processing circuitry is configured to cooperatively serve one or more user equipments (UEs) with the one or more other eNBs. The processing circuitry is also configured to allow the eNB to wirelessly communicate on a resource with the one or more other eNBs following a predetermined schedule known to the eNB. The resource includes a time resource and/or a frequency resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software/firmware. It should be noted that the functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 8 illustrates an example of a transmitting UE interfering with a successful reception by a UE in a neighboring cell according to this disclosure;

FIG. 9 illustrates an example of a time division multiplex (TDM) approach for a simple hotspot scenario according to this disclosure;

FIG. 12A illustrates an example of a basic component of the X2 scheduling scheme that can be the Tx-3, Rx-3 transmission according to this disclosure;

FIG. 22 illustrates an example of a designated portion of a subframe according to this disclosure;

FIG. 23 illustrates an example of eNBs in point-to-point backhaul transmission engagement according to this disclosure;

DETAILED DESCRIPTION

FIGS. 1 through 35, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
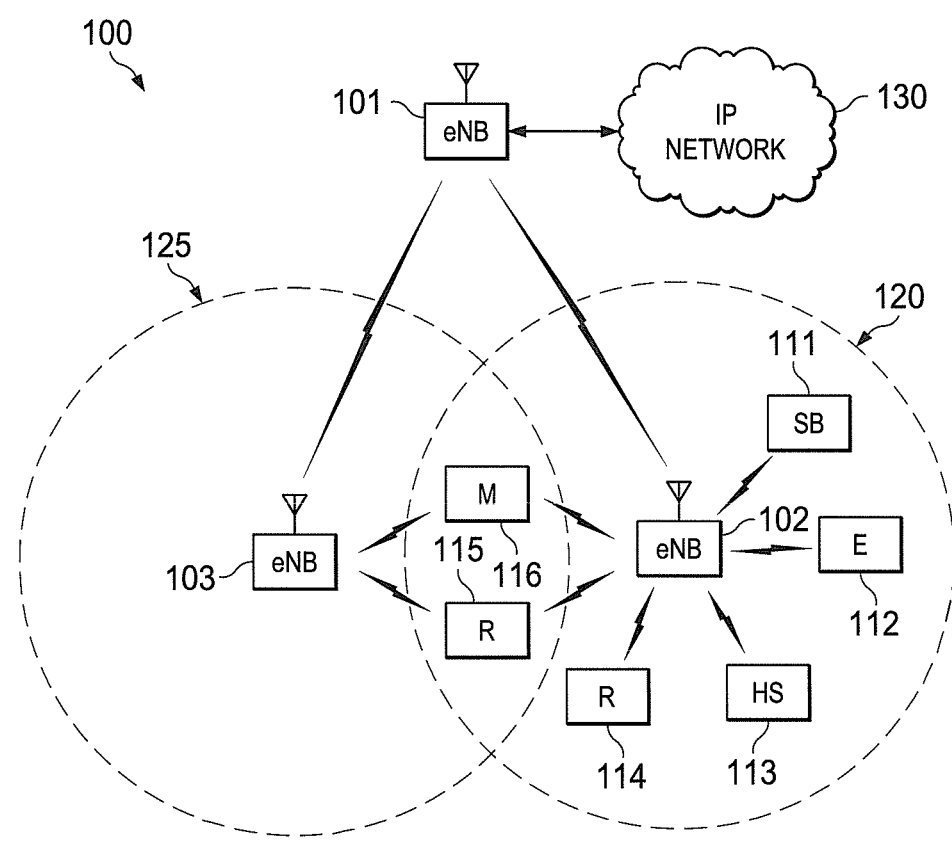
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions. As described in more detail below, the eNBs 101-103 support various transmission and scheduling schemes for wireless fronthaul.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
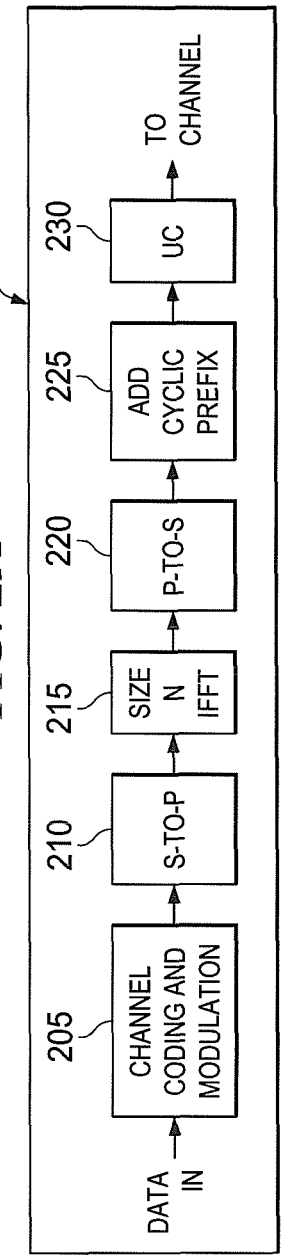
FIGS. 2A and 2B illustrate example wireless transmit and receive paths according to this disclosure.
Figure 2B:
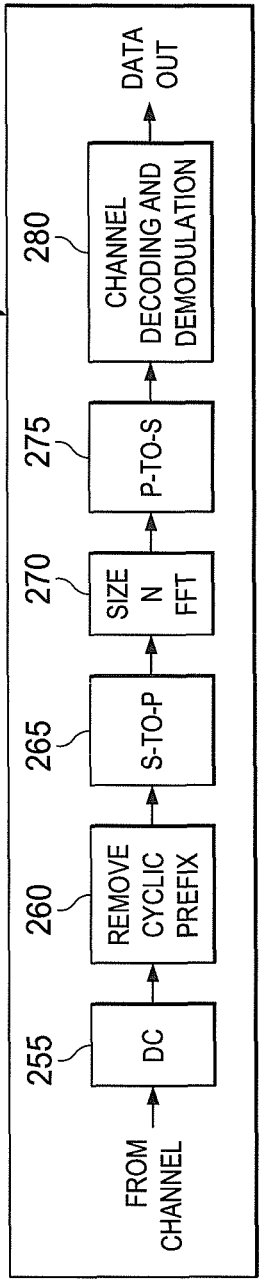

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
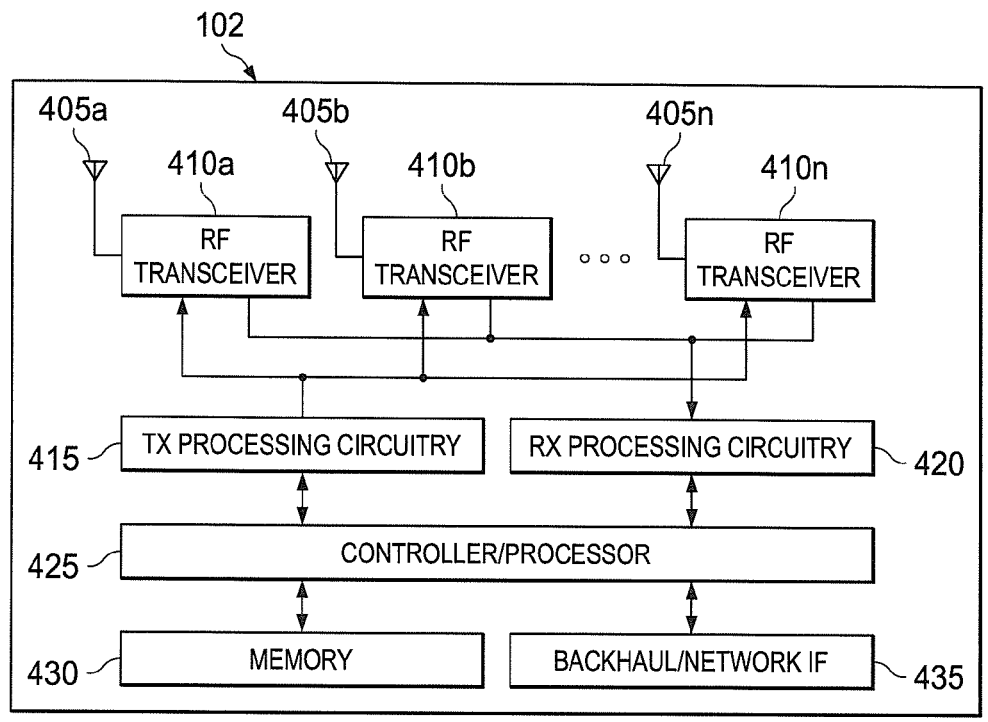
FIG. 3 illustrates an example eNodeB (eNB) according to this disclosure.

FIG. 3 illustrates an example eNB 102 according to this disclosure. The embodiment of the eNB 102 illustrated in FIG. 3 is for illustration only, and the eNBs 101 and 103 of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 405a-405n, multiple RF transceivers 410a-410n, transmit (TX) processing circuitry 415, and receive (RX) processing circuitry 420. The eNB 102 also includes a controller/processor 425, a memory 430, and a backhaul or network interface 435.

The RF transceivers 410a-410n receive, from the antennas 405a-405n, incoming RF signals, such as signals transmitted by UEs in the network 100. The RF transceivers 410a-410n down-convert the incoming RF signals to generate IF or baseband signals. The IF or baseband signals are sent to the RX processing circuitry 420, which generates processed baseband signals by filtering, decoding, and/or digitizing the baseband or IF signals. The RX processing circuitry 420 transmits the processed baseband signals to the controller/processor 425 for further processing.

The TX processing circuitry 415 receives analog or digital data (such as voice data, web data, e-mail, or interactive video game data) from the controller/processor 425. The TX processing circuitry 415 encodes, multiplexes, and/or digitizes the outgoing baseband data to generate processed baseband or IF signals. The RF transceivers 410a-410n receive the outgoing processed baseband or IF signals from the TX processing circuitry 415 and up-converts the baseband or IF signals to RF signals that are transmitted via the antennas 405a-405n.

The controller/processor 425 can include one or more processors or other processing devices that control the overall operation of the eNB 102. For example, the controller/processor 425 could control the reception of forward channel signals and the transmission of reverse channel signals by the RF transceivers 410a-410n, the RX processing circuitry 420, and the TX processing circuitry 415 in accordance with well-known principles. The controller/processor 425 could support additional functions as well, such as more advanced wireless communication functions. For instance, the controller/processor 425 could support beam forming or directional routing operations in which outgoing signals from multiple antennas 405a-405n are weighted differently to effectively steer the outgoing signals in a desired direction. Any of a wide variety of other functions could be supported in the eNB 102 by the controller/processor 425. In some embodiments, the controller/processor 425 includes at least one microprocessor or microcontroller.

The controller/processor 425 is also capable of executing programs and other processes resident in the memory 430, such as a basic OS and operations for cooperatively serving one or more UEs. The controller/processor 425 can move data into or out of the memory 430 as required by an executing process.

The controller/processor 425 is also coupled to the backhaul or network interface 435. The backhaul or network interface 435 allows the eNB 102 to communicate with other devices or systems over a backhaul connection or over a network. The interface 435 could support communications over any suitable wired or wireless connection(s). For example, when the eNB 102 is implemented as part of a cellular communication system (such as one supporting 5G, LTE, or LTE-A), the interface 435 could allow the eNB 102 to communicate with other eNBs over a wired or wireless backhaul connection. When the eNB 102 is implemented as an access point, the interface 435 could allow the eNB 102 to communicate over a wired or wireless local area network or over a wired or wireless connection to a larger network (such as the Internet). The interface 435 includes any suitable structure supporting communications over a wired or wireless connection, such as an Ethernet or RF transceiver.

The memory 430 is coupled to the controller/processor 425. Part of the memory 430 could include a RAM, and another part of the memory 430 could include a Flash memory or other ROM.

Although FIG. 3 illustrates one example of eNB 102, various changes may be made to FIG. 3. For example, the eNB 102 could include any number of each component shown in FIG. 3. As a particular example, an access point could include a number of interfaces 435, and the controller/processor 425 could support routing functions to route data between different network addresses. As another particular example, while shown as including a single instance of TX processing circuitry 415 and a single instance of RX processing circuitry 420, the eNB 102 could include multiple instances of each (such as one per RF transceiver). Also, various components in FIG. 3 could be combined, further subdivided, or omitted and additional components could be added according to particular needs.

Innovations in wireless backhaul in practical mobile network deployment scenarios can assist in providing for a 5G vision of providing "1 Gbit/s anywhere." Mobile network deployment scenarios can include, for example, when eNBs are wirelessly connected for the purposes of backhauling user data to/from a core network (such as network 130) or for the purposes of interference management and coordination. Multiplexing backhaul and access on the same frequency band (in-band backhaul) can have cost benefits from a hardware perspective and a frequency reuse perspective. However, some significant technological challenges can come with multiplexing backhaul and access on the same frequency band.

In order to overcome some significant challenges, an in-band solution to meet backhaul and inter-eNB coordination challenges that accompany network densification can be considered. Additionally, novel solutions for time-multiplexing backhaul and access to maximize frame structure reuse and novel scheduling schemes for inter-eNB communications (such as forwarding or relaying data communications) among neighboring eNBs can also be considered. The concepts to be discussed in this patent document can demonstrate that an in-band backhaul for data backhauling or inter-eNB coordination can be feasible without significantly hurting cell access capacities.

The next generation of cellular communication systems (such as 5G systems) can be expected to meet the growing demands for data through densification of networks using high-capacity small cells. As networks become dense (such as through "small cell" deployments), the cost of bringing fiber to each of the small cells can become prohibitively expensive. Planning very high capacity backhaul links from eNBs to the core can pose major challenges, especially if "lamp post" or "rooftop" eNB deployments turn out to be the mainstream scenarios for small cells.

Figure 4:
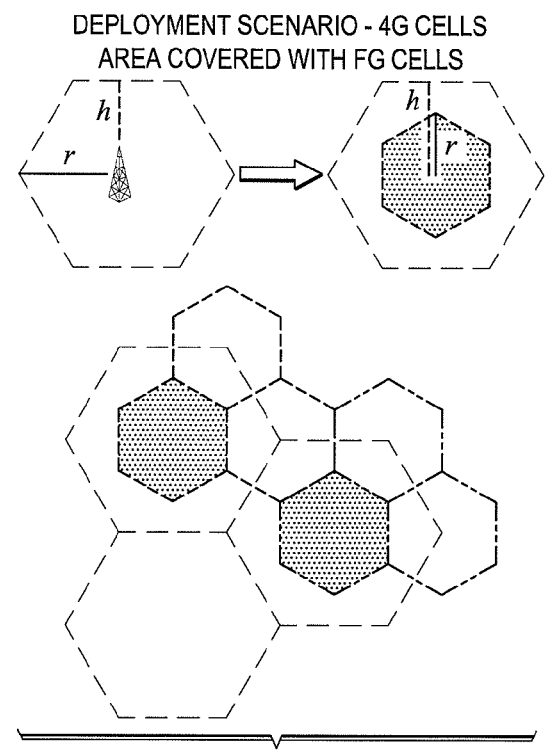
FIG. 4 illustrates an example area wide coverage of 4G cells deployed as a grid and replaced with 5G cells according to this disclosure.

One potential deployment scenario for next generation densified networks can be an area wide coverage of 4G cells that are replaced by 5G cells with higher capacities but smaller coverage areas. FIG. 4 illustrates an example area wide coverage of 4G cells deployed as a grid and replaced with 5G cells according to this disclosure. Specifically, FIG. 4 illustrates an embodiment of an area wide coverage of 4G cells deployed as a grid and replaced with 5G cells of radius $$\frac{r}{\sqrt{3}}.$$

Figure 5A:
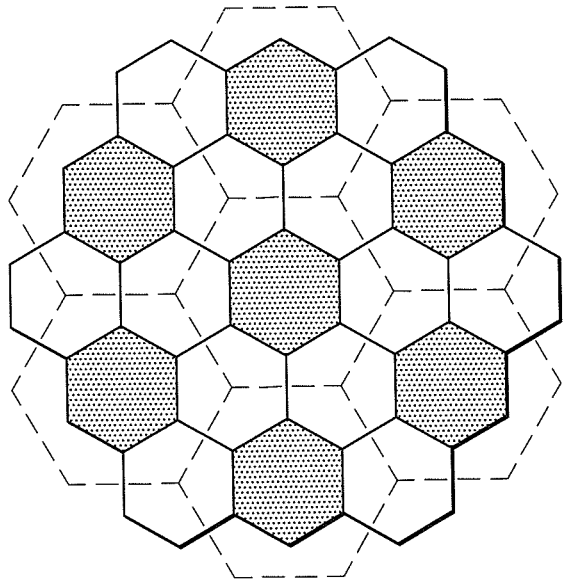
FIGS. 5A and 5B illustrate examples of 5G cell grid-based deployments according to this disclosure.
Figure 5B:
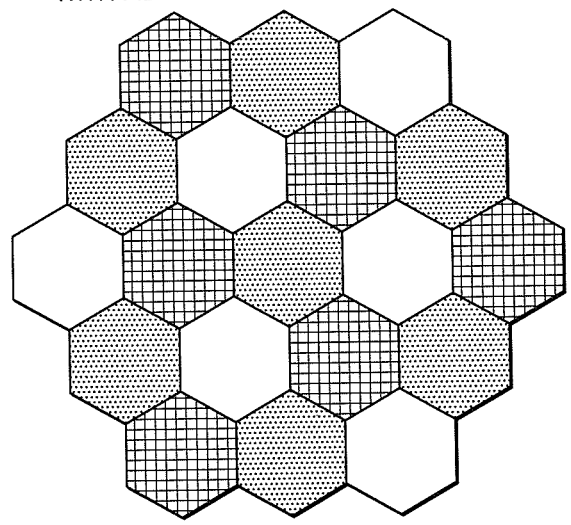

FIGS. 5A and 5B illustrate examples of 5G cell grid-based deployments according to this disclosure. Assuming the availability of fiber backhaul to the original 4G cell sites and assuming that there is no additional fiber backhaul, the fiber backhaul density of the deployment in FIG. 4 can be computed to be ⅓ (such as one in every three 5G cells can be fibered as illustrated in FIG. 5A). Furthermore, by bringing fiber to some of the unwired 5G cells, the fiber density can be increased to a higher ratio as illustrated in FIG. 5B for a fiber density of ⅔.

Figure 6:
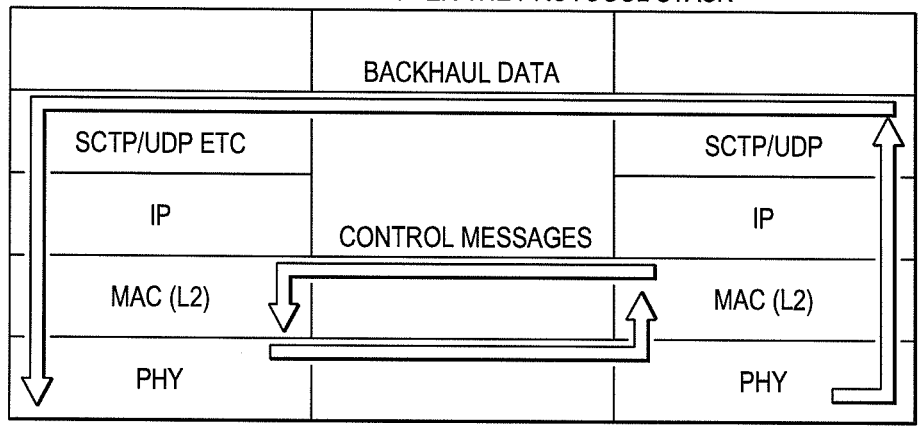
FIG. 6 illustrates an example of transmitting control messages and backhaul data over a protocol stack according to this disclosure.

In some cases, bringing fiber to all cells may not be feasible. In cases where bringing fiber to cells is not feasible, in some embodiments, a solution can be to use wireless backhaul links between unwired 5G cells and an aggregation gateway (AGW). In other embodiments, a solution can be to use wireless backhaul links between unwired 5G eNBs and neighboring wired eNBs. Current wireless backhaul solutions, such as dedicated point-to-point microwave links (outof-band) for connecting eNBs to the AGW or for connecting eNBs to each other, can be inadequate for effectively solving the aforementioned problems. Current wireless backhaul solutions can be available in the 60 GHz range and can achieve backhaul capacities up to 3 Gb/s. However, deploying these wireless backhaul solutions can still be expensive, and the costs can scale linearly with the number of backhaul links. Since each microwave link can require additional spectrum as well as a separate radio unit, the cost of deploying microwave links may not satisfy economies of scale. Also, as networks become dense and interference becomes a limiting factor, low-latency inter-eNB links can also be required to enable coordination mechanisms for interference management. Coordination techniques, such as coordinated Multipoint (CoMP) or inter-cell interference coordination (ICIC), are already incorporated in LTE release 10 and beyond. In some embodiments, in order to implement coordinated interference management techniques, eNBs can be used to exchange control messages with their neighboring peer eNBs. The control messages can use a different protocol stack compared to backhaul traffic and can even be achieved using L2-level communications, as shown in FIG. 6. FIG. 6 illustrates an example of transmitting control messages and backhaul data over a protocol stack according to this disclosure.

Point-to-multipoint wireless backhaul architectures can address at least some of the previously-identified problems, especially in terms of latency and costs. Furthermore, point-to-multipoint architectures can allow for intermediate aggregation of backhaul traffic and thus can reduce the backhaul radio infrastructure as well as take advantage of point-to-multipoint transmissions to improve latency.

In some embodiments, such as at higher frequencies where systems with wider channel bandwidths can be deployed, in-band point-to-multipoint solutions can be considered. The term "in-band" means that access links (eNB-to-UE links) as well as backhaul links (eNB-to-eNB links or eNB-to-AGW links) can be multiplexed on the same frequency band. In-band point-to-multipoint solutions can reduce or eliminate the costs incurred by operators to buy separate spectrums for backhauling, thereby allowing for spectrum reuse. Additionally, in-band point-to-multipoint solutions can enable a single radio unit to serve backhaul as well as access purposes, thereby allowing for hardware reuse.

Figure 7A:
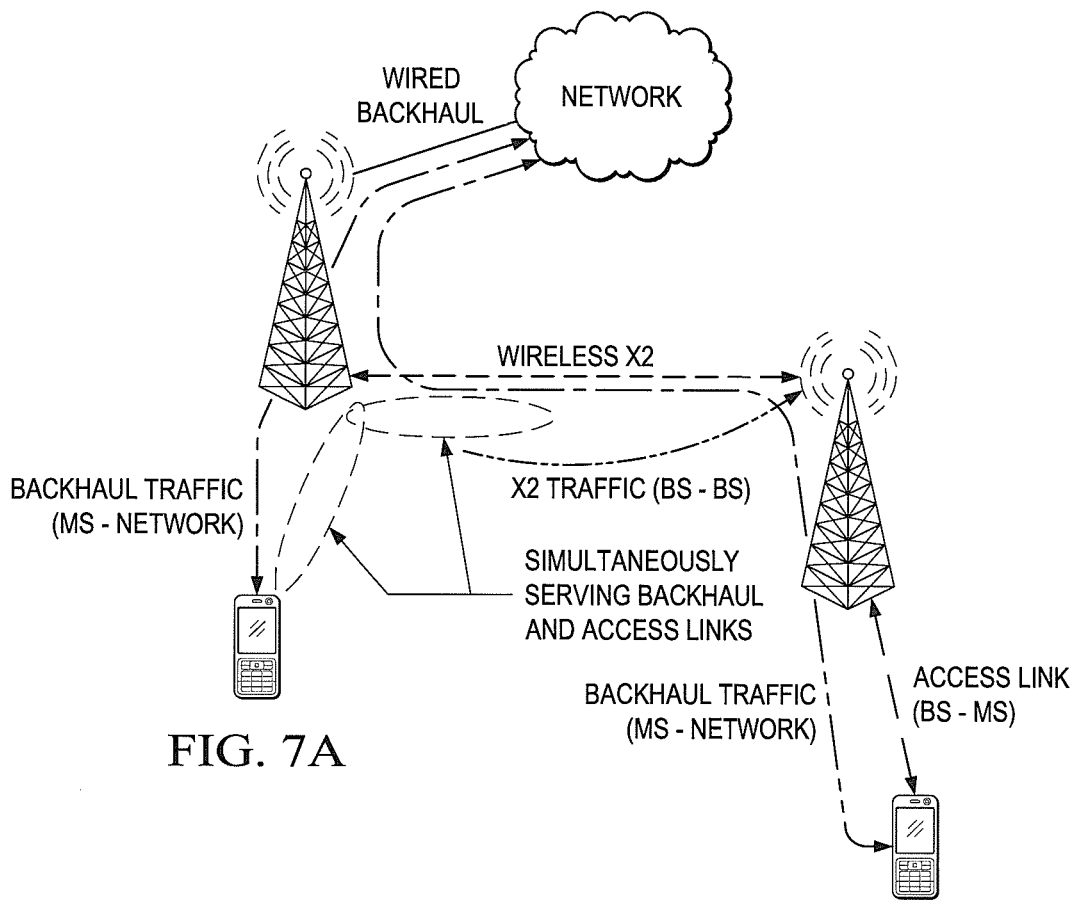
FIG. 7A illustrates an example of backhaul and X2 traffic over wireless X2according to this disclosure.

FIG. 7A illustrates an example of backhaul and X2 traffic over wireless X2 according to this disclosure. In this disclosure, the term "wireless X2" is used to denote a wireless link between two eNBs. For example, as illustrated in FIG. 7A, the eNB-to-eNB link itself can carry backhaul traffic as well as X2 traffic.

Figure 7B:
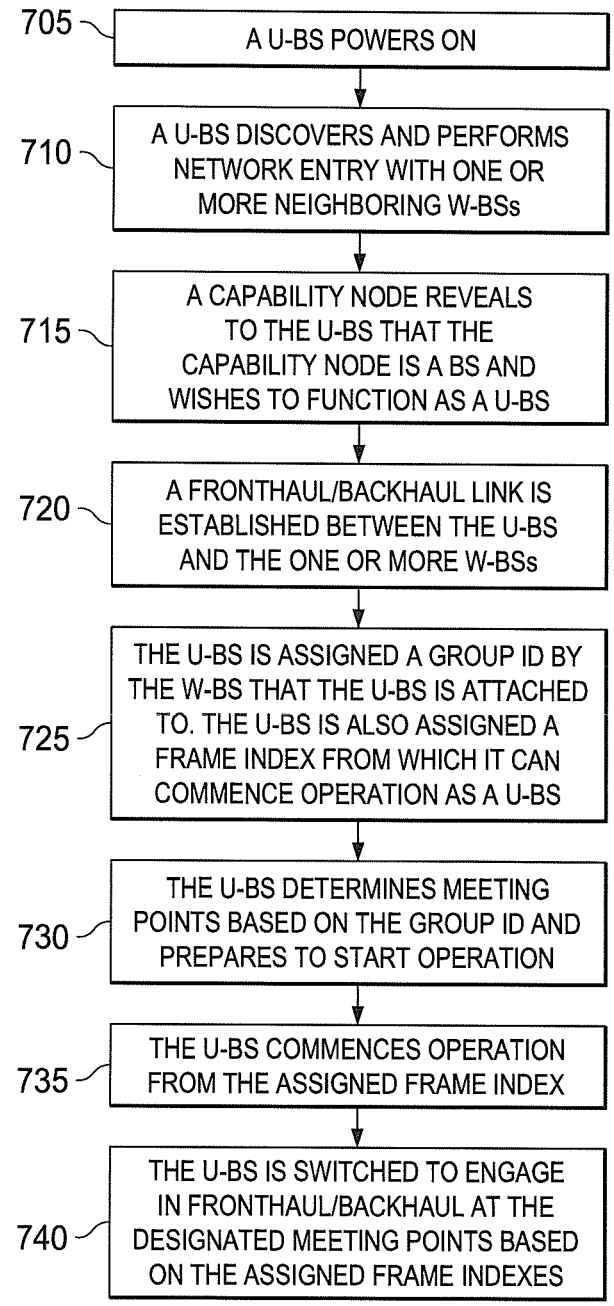
FIG. 7B illustrates an example of a high-level operation for in-band point-to-multipoint wireless backhaul according to this disclosure.
Figure 10:
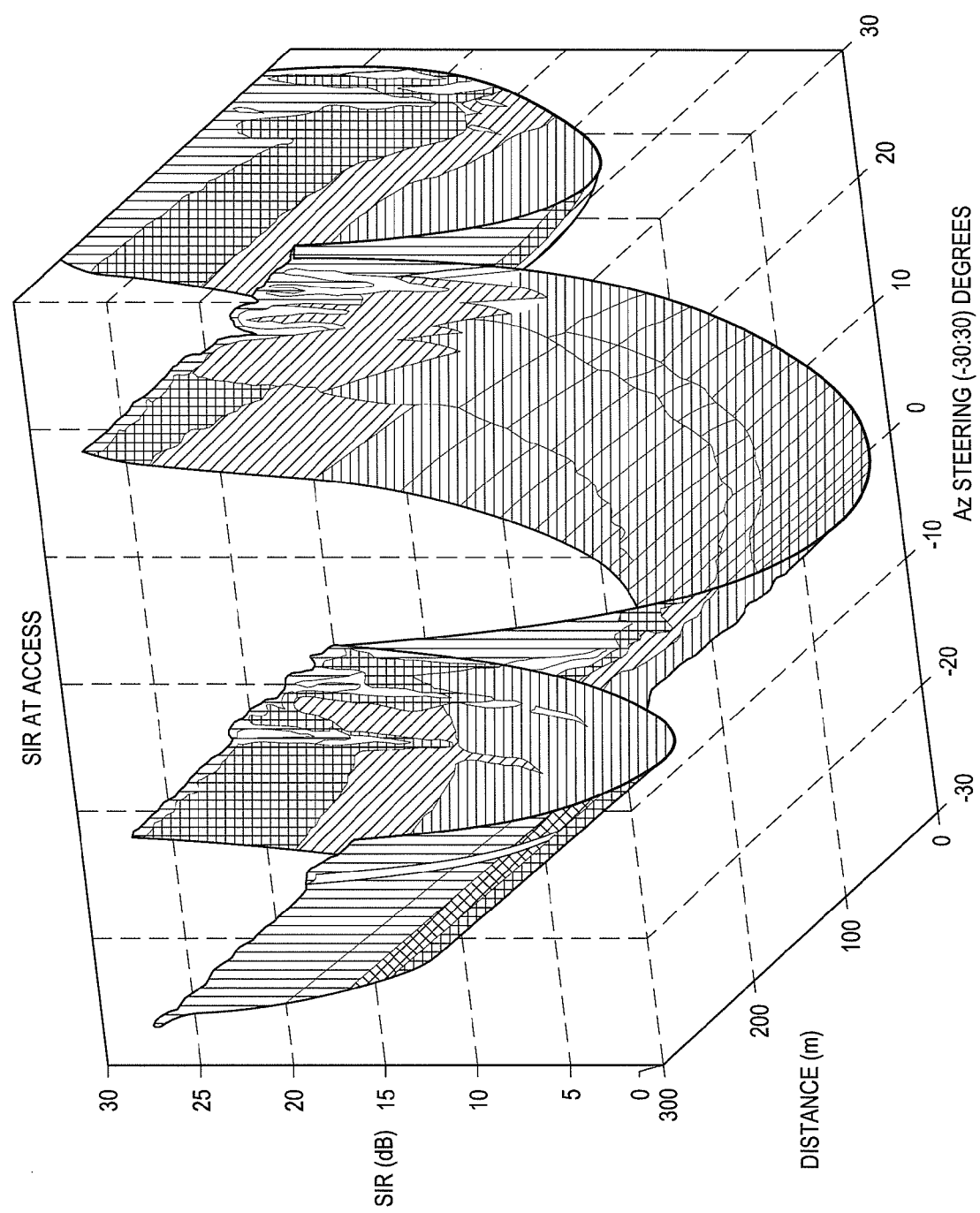
FIG. 10 illustrates an example of a graph of access-to-backhaul signal-to-interference ratio according to this disclosure.

FIG. 7B illustrates an example of a high-level operation for in-band point-to-multipoint wireless backhaul according to this disclosure. At step 705, an unwired eNB (U-eNB) powers on. At step 710, the U-eNB can discover and perform network entry with one or more neighboring wired eNBs (W-eNBs). A U-eNB represents an eNB that lacks a physical backhaul link (such as a fiber link), while a W-eNB represents an eNB that has a physical backhaul link (such as a fiber link). At step 715, a capability node can reveal to the U-eNB that the capability node is an eNB and wishes to function as a U-eNB. At step 720, fronthaul/backhaul links can be established between the U-eNB and one or more W-eNBs.

At step 725, the U-eNB can be assigned a group identification (ID) by the W-eNB indicating that the U-eNB is attached to (such as linked to) the W-eNB and that the U-eNB can be assigned a frame index from which it can commence operation as a U-eNB. At step 730, the U-eNB can determine meeting points based on the group ID and can prepare to start operation. At step 735, the U-eNB can commence operation from the assigned frame index. Furthermore, at step 740, the U-eNB can switch to engage in fronthaul/backhaul transmissions at the designated meeting points based on the assigned frame indexes.

In some embodiments, in order to provide in-band point-to-multipoint backhaul for connecting eNBs to the core and to other eNBs, various factors can be considered. These factors include how interference between access and backhaul is handled, how scheduling multiple X2 links is handled (such as when and which eNBs listen to which other eNBs as well as who/what does the scheduling), the hardware capabilities at the eNBs (such as if full duplexing is considered), and how Quality of Service (QoS) is managed (such as for backhaul traffic on wireless X2 links). To address at least how interference between access and backhaul is handled and how scheduling multiple X2 links is handled, multiplex X2 links with access can employ Space Division Multiplexing (SDM) of X2 links and access. However, as illustrated in FIG. 7A, when transmissions on the backhaul links are scheduled simultaneously with access links such as by using SDMA, low signal-to-interference ratios (SIRs) can be observed at access. In some situations, the loss in SIR at access can be observed up to 25 dB for some values of Azimuth steering.

In designing an in-band backhaul system, it may be necessary or desirable to ensure that certain system design constraints are satisfied. For example, one such design constraint can be uplink-downlink interference. Uplink-downlink interference can arise, for instance, when one cell is engaged in uplink access while a neighboring cell performs downlink access at the same time or substantially the same time. In this situation, a transmitting UE can interfere with a successful reception by a UE in a neighboring cell as illustrated in FIG. 8. In some embodiments, in order to avoid uplink-downlink interference, a cell cannot engage in uplink access when a neighboring cell performs downlink access. Furthermore, in order to avoid the UE receiving periodic scheduling X2 links, the X2 link scheduling can be withheld from the UE (such as not sent to the UE).

Another example design constraint can be the hardware capabilities of the eNBs. For example, hardware capabilities can dictate the ability of SDM X2 links or SDM X2 with access. Furthermore, hardware capabilities can dictate inter-panel interference. Inter-panel interference can prevent a panel from receiving a transmission when an adjacent panel is transmitting and vice versa. Accordingly, the ability of the hardware to handle inter-panel interference can affect the design of an in-band backhaul system.

Due to the potential constraints arising out of eNB hardware capabilities, in some embodiments, minimum requirements can be imposed on eNB hardware capabilities. For example, an assumption can be made that no SDM is permitted between an X2 link and an access link or between two X2 links in a sector. Furthermore, inter-panel interference can be avoided by assuming that all panels are either receiving or transmitting at any given time.

Based on the above assumptions, in some embodiments, a time division multiplex (TDM) based in-band wireless X2 scheme for backhauling 5G cells can be implemented. This scheme can enable the exchange of control messages between peer eNBs. With TDM-based wireless X2, access and wireless X2 can be time-multiplexed with each other by reserving a portion of a frame for wireless X2 transmissions or receptions. FIG. 9 illustrates an example of a TDM approach for a simple hotspot scenario according to this disclosure.

As illustrated in FIG. 9, a portion of a frame can be used for wireless X2 transmissions between W-eNBs and U-eNBs. As shown in the frame structure, multiplexing backhaul with access can lead to a loss in access capacity that depends on the fraction α. By increasing α, a larger backhaul bandwidth for the U-eNBs can be provided, and consequently higher access capacities for the U-eNBs can be enabled. However, employing very high values of α, while affecting the access capacities of W-eNBs, can have other disadvantages on frame structure designs. For example, with a W-eNB cell backhauling multiple 5G hotspots as illustrated in FIG. 9, a TDM-based in-band wireless X2 scheme for the W-eNB to support n U-eNBs can be used to communicate with each U-eNB for a fraction $$\frac{\alpha}{n}$$

of time. If the X2 link has a transmission rate $r_f$ and is engaged for a fraction $$\frac{\alpha}{n}$$

of the time, the backhaul throughput achievable by a U-eNB can be given by $$\frac{\alpha}{n} r_f,$$

which also can yield a maximum cell access capacity.

Figure 11:
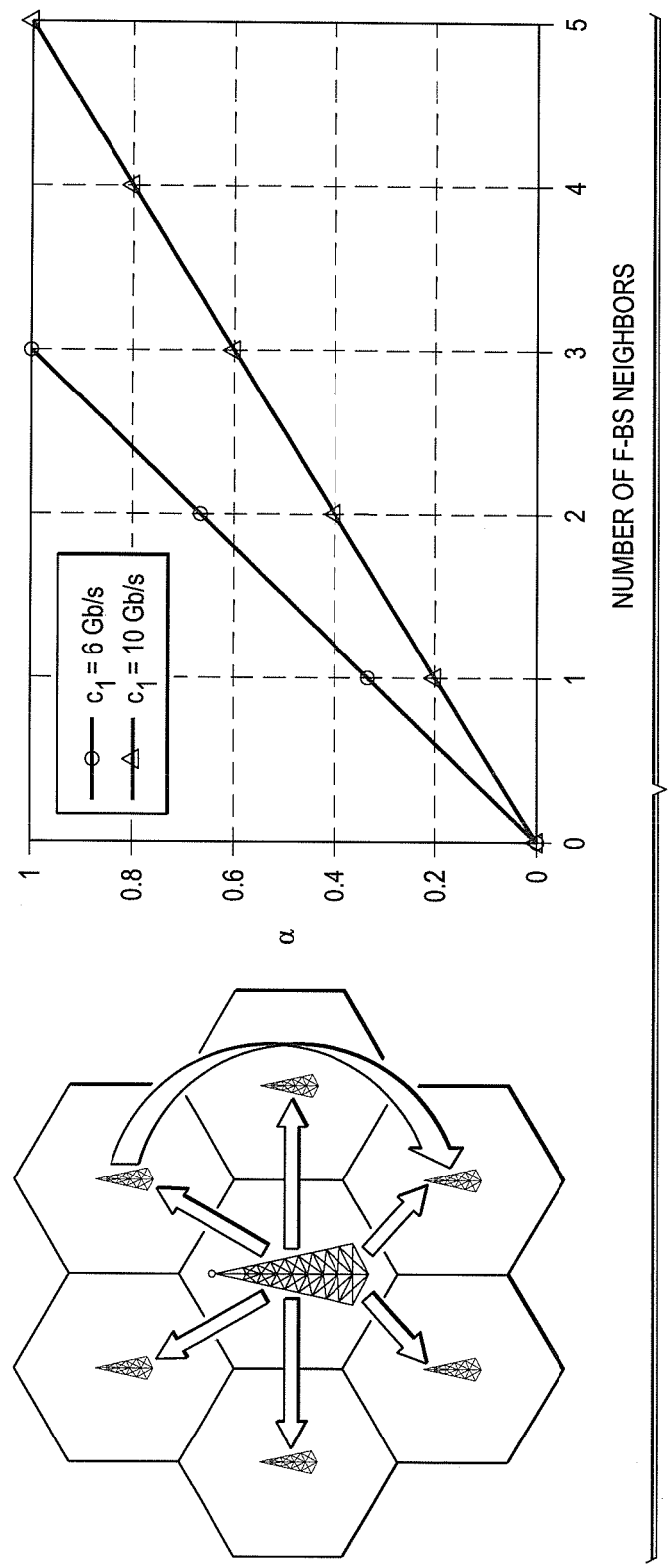
FIG. 11 illustrates an example of a plot that shows a values that can be needed to support unwired-eNB (U-eNB) cell access capacity according to this disclosure.

FIG. 11 illustrates an example of a plot that shows α values that can be needed to support U-eNB cell access capacity according to this disclosure. Specifically, FIG. 11 illustrates a plot that shows the α values that can be needed to support a U-eNB cell access capacity of 2 Gb/s with an X2 transmission rate of 6 Gb/s. FIG. 11 also illustrates a plot that shows that, even for three neighbors, the fraction α can be as high as 0.5. By assuming that a fraction of the uplink portion of a subframe can be reserved for X2 transmissions, the entire uplink portion of a W-eNB can be utilized for X2 to support an α value of 0.5. Because the fraction α can be used in a TDM-based in-band wireless X2 scheme, no more than 50% of each uplink subframe can be used to schedule X2 transmissions. The upper bound can serve as a trade-off between α and access capacities for the area wide deployment of 5G cells, as well as to enable robust hybrid automatic repeat request (HARQ) retransmissions for each subframe.

In some embodiments, a scheduling scheme can be used to decide which eNBs will engage in transmissions and receptions over wireless X2 links and when eNBs will engage in transmissions and receptions over wireless X2 links. For dense networks of 5G cells, eNBs can communicate with peer eNBs for a variety of reasons. For example, a U-eNB can be required to transmit or receive backhaul traffic from W-eNBs. Additionally, all eNBs can be configured to exchange control messages with neighboring eNBs for interference coordination, such as CoMP or ICIC. In an embodiment, control message can include interference reduction messages which can be used for interference coordination. Interference reduction messages can indicate a channel quality between a UE and an eNB (such as first or second eNB). Control messages can also include UE scheduling information based on the interference reduction message. Control messages can also include eNB power-down information indicating a sleep mode for an eNB or a low duty cycle mode for an eNB.

Furthermore, the eNBs can be configured to communicate data (such as forwarding/relaying data) between a network and one or more UEs. For example, a first and a second eNBs can be configured to cooperatively serve one or more UEs by communicating data (such as forwarding/relaying data) between a network and each of one or more UEs through at least the first eNB and the second eNB.

Any X2 transmissions between neighboring eNBs can be composed of solely control messages, solely data, or both control messages and data as illustrated in TABLE 1.

TABLE 1

|  | Control Messages | Data | Control Messages plus Data |
| --- | --- | --- | --- |
| Transmission Duration | Very Small/ Negligible | Significant | Significant |
| Transmitting eNBs | All Neighboring eNBs | Unwired and Wired eNBs | Unwired and Wired eNBs |

The TDM-based scheme can map these X2 transmissions to specific portions of a subframe. The scheduling scheme for a deployment of 5G cells can have additional fiber (such as additional fiber with a fiber density of ⅓ or greater).

Assuming that SDM of X2 links cannot be permitted, each sector panel can engage in at most one X2 transmission at any given time. For example, FIG. 12A illustrates an example of a basic component of the X2 scheduling scheme that can be the Tx-3, Rx-3 transmission according to this disclosure. As illustrated in FIG. 12A, if each cell has three sectors, each cell can engage in simultaneous transmissions or receptions over three X2 links. Beam directions can be steered to target three neighboring cells and thus enable transmissions to six neighboring eNBs. The "transmit to three, receive from three" (Tx-3, Rx-3) scheme can be used as a basic building block to design an X2 link scheduling scheme.

Figure 12B:
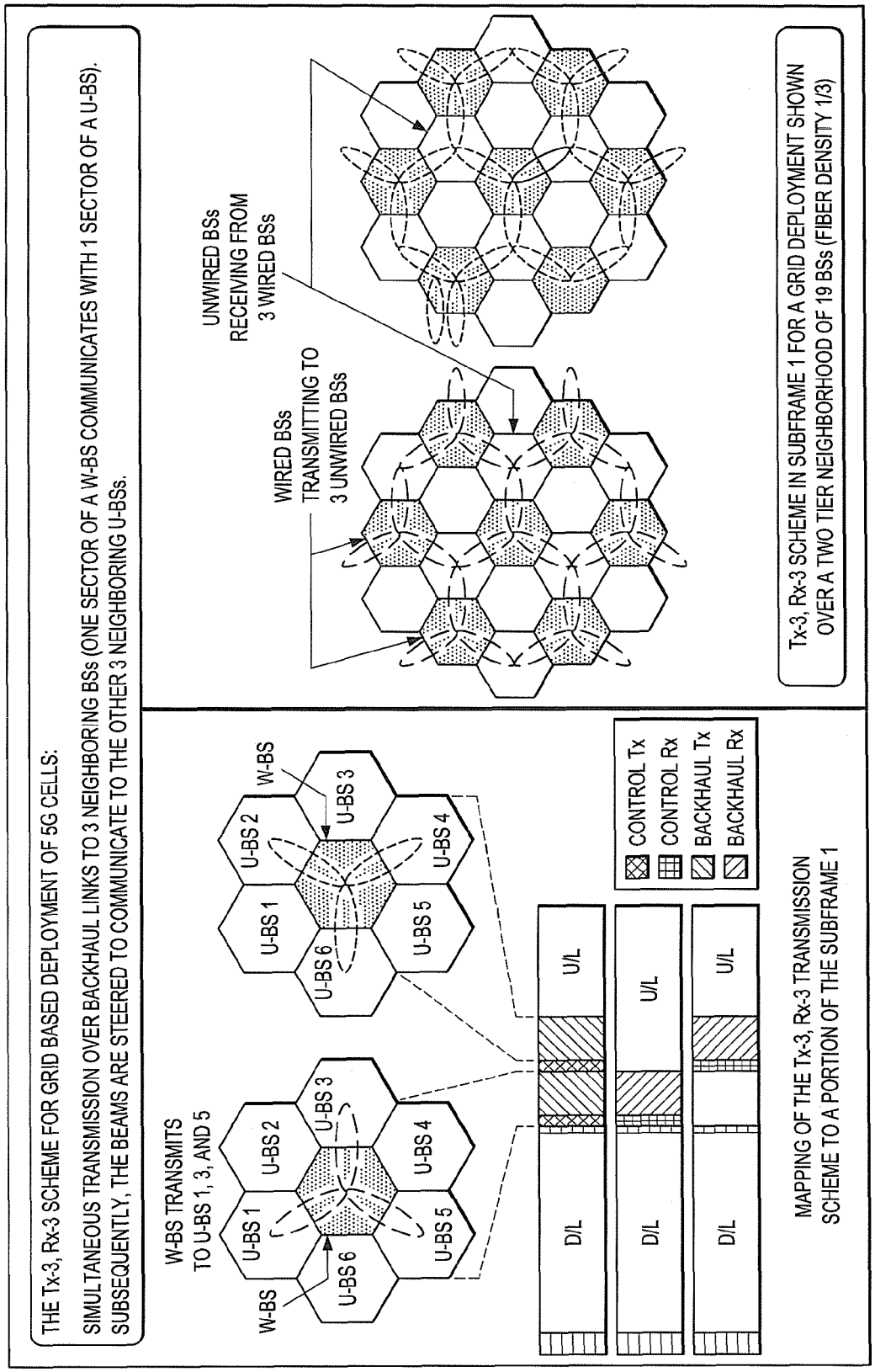
FIG. 12B illustrates an example of a Tx-3, Rx-3 scheme grid-based deployment according to this disclosure.

FIG. 12B illustrates an example of a Tx-3, Rx-3 scheme grid-based deployment according to this disclosure. A W-eNB simultaneously transmits over backhaul links to three neighboring eNBs (U-eNBs 1, 3, and 5) such that one sector of the W-eNB communicates with one sector of a U-eNB. Subsequently, beams can be steered so that the W-eNB simultaneously transmits over backhaul links to three other neighboring eNBs (U-eNBs 2, 4, and 6).

TABLE 2 lists parameters that can be used to analyze the X2 scheduling schemes.

TABLE 2

| $\alpha t_{frame}$ | Duration of a frame used for X2 transmissions |
| --- | --- |
| $\alpha' t_{frame}$ | Duration of each subframe used for X2 transmissions |
| $t_{x_u}, t_{x_d}$ | Duration that a U-eNB transmits and receives backhaul data over X2 links, respectively |
| $c_{a_u}, c_{a_d}$ | Maximum uplink and downlink access capacity of a U-eNB |
| $r_f$ | Transmission rate of X2 link |
| $c_{f_u}, c_{f_d}$ | Backhaul throughput leaving and entering U-eNB |

Figure 13:
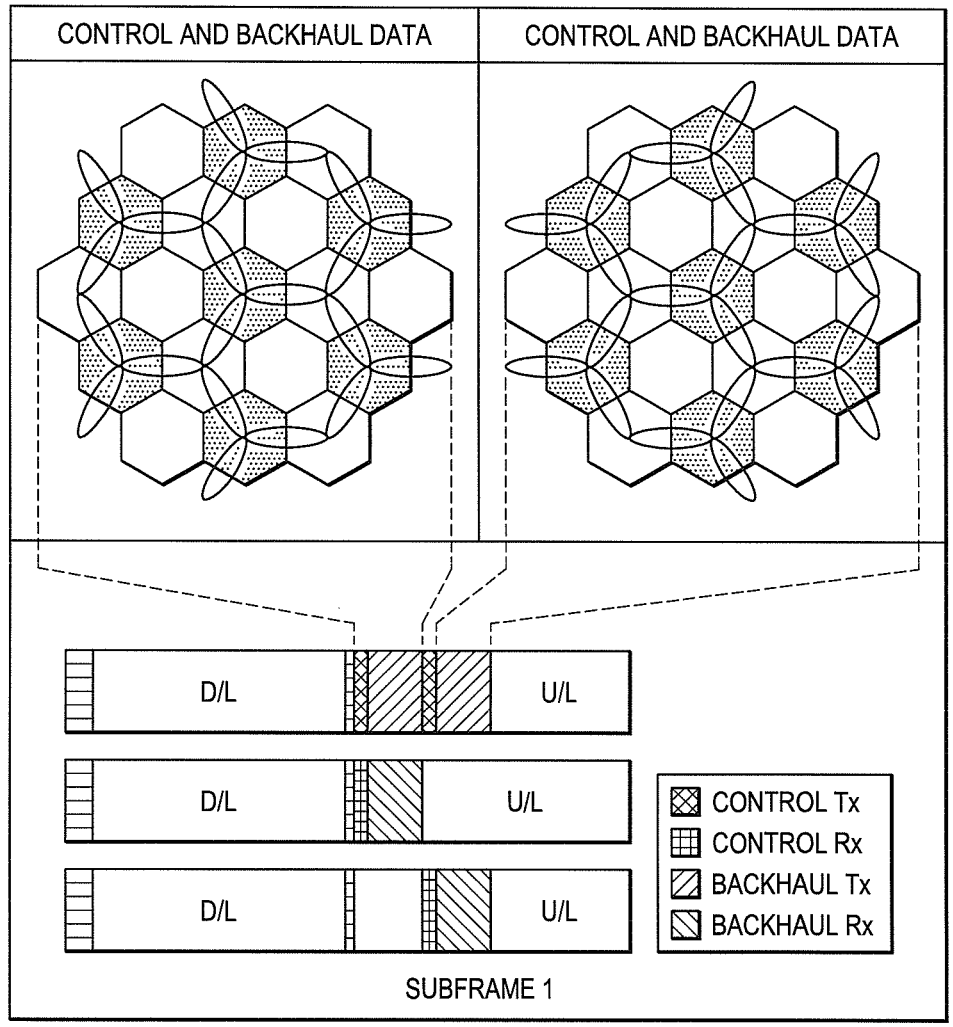
FIG. 13 illustrates an example of mapping an Tx-3, Rx-3 transmission to a portion of a subframe according to this disclosure.

As previously disclosed, a fraction of the uplink portion of a subframe can be used for communicating over X2 links. FIG. 12A illustrates that the basic component of the X2 scheduling scheme can be the Tx-3, Rx-3 transmission scheme. FIG. 13 illustrates an example of mapping the Tx-3, Rx-3 transmission to a portion of a subframe according to this disclosure. As illustrated in FIG. 13, subframe 1 is a group of eNBs (such as 4G wired eNBs) that can, for example, initially transmit over X2 links to three neighboring U-eNBs. Subsequently, the group of eNBs can transmit to three other neighboring U-eNBs over the X2links. In some embodiments, when a W-eNB communicates with a U-eNB, the W-eNB and the U-eNB can still transmit control messages and backhaul data. Otherwise, if the W-eNB and the U-eNB cannot transmit both control messages and backhaul data, only control messages can be transmitted.

Figure 14:
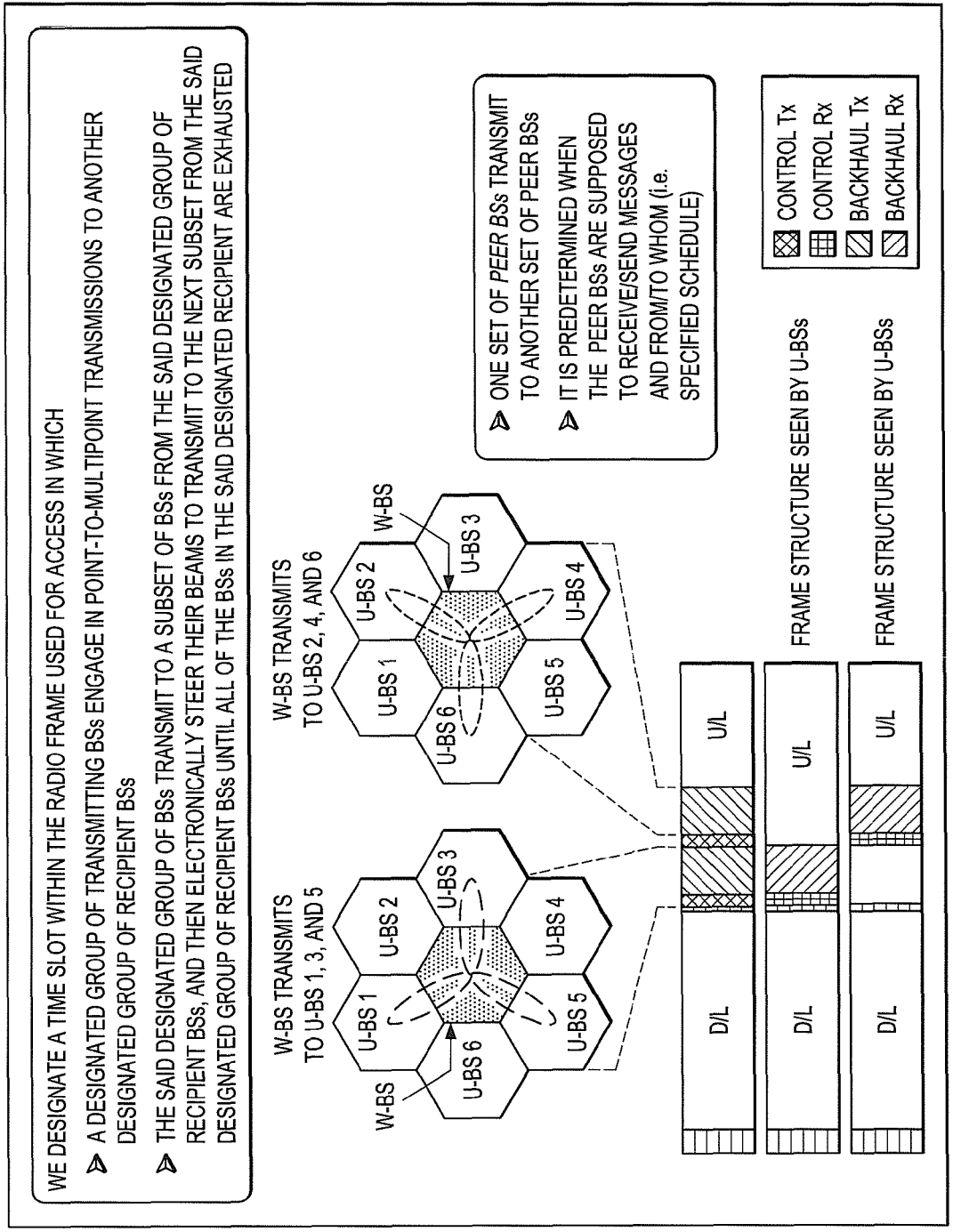
FIG. 14 illustrates another example of a Tx-3, Rx-3 scheme for grid-based deployment according to this disclosure.

FIG. 14 illustrates another example of a Tx-3, Rx-3 scheme for grid-based deployment according to this disclosure. As shown in FIG. 14, a time slot can be designated within a radio frame used for access. A designated group of transmitting eNBs can engage in point-to-multipoint transmissions with another designated group of recipient eNBs. The designated group of eNBs can transmit to a subset of eNBs from the designated group of recipient eNBs. Subsequently, the designated group of eNBs can electronically steer their beams to transmit to the next subset from the designated group of recipient eNBs until all eNBs in the designated group of recipient eNBs are exhausted. In some embodiments, it can be predetermined when the peer eNBs are supposed to receive/send messages and from/to whom (such by using a specified schedule).

Figure 15:
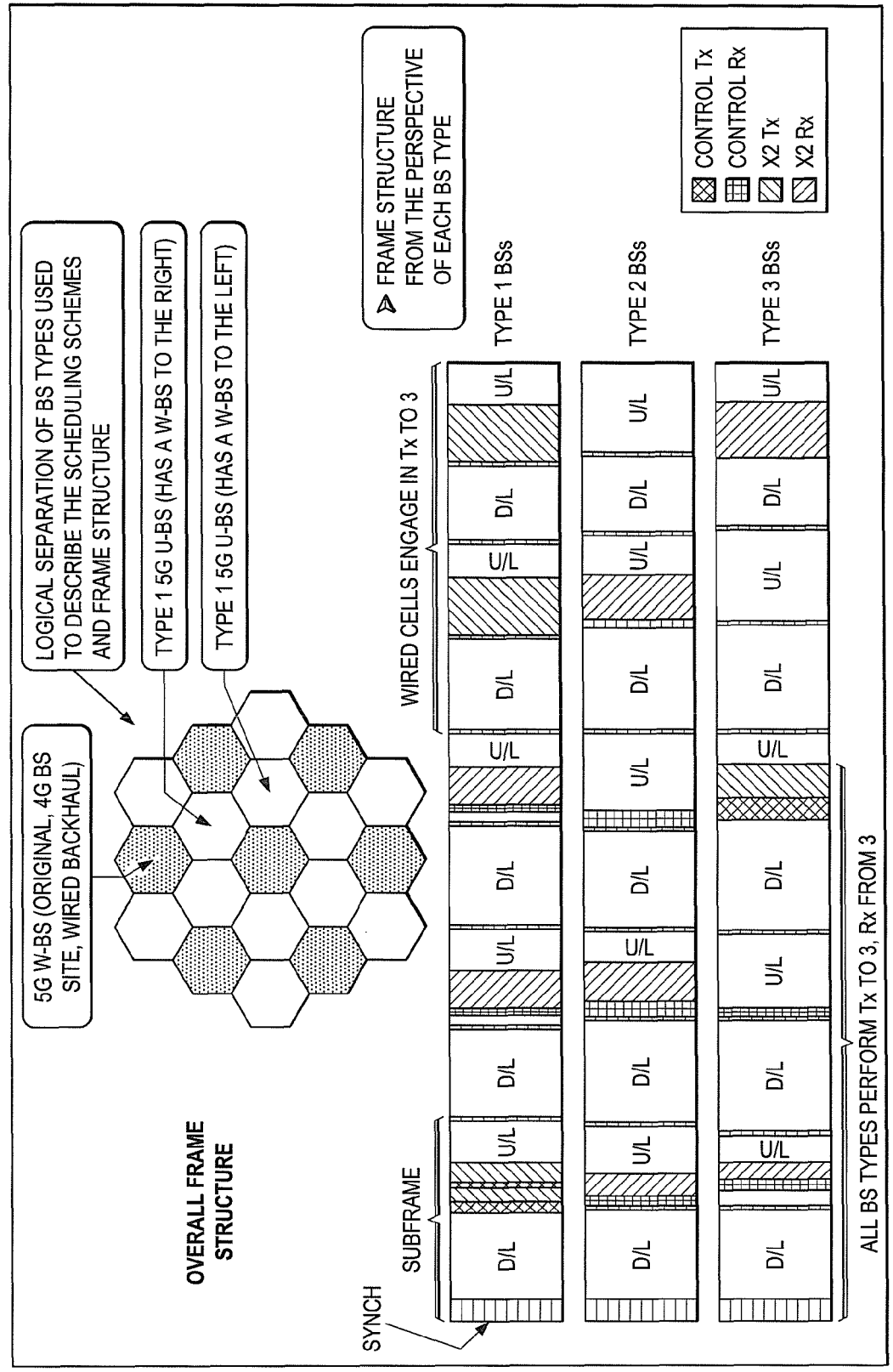
FIG. 15 illustrates an example of an overall frame structure according to this disclosure.
Figure 16:
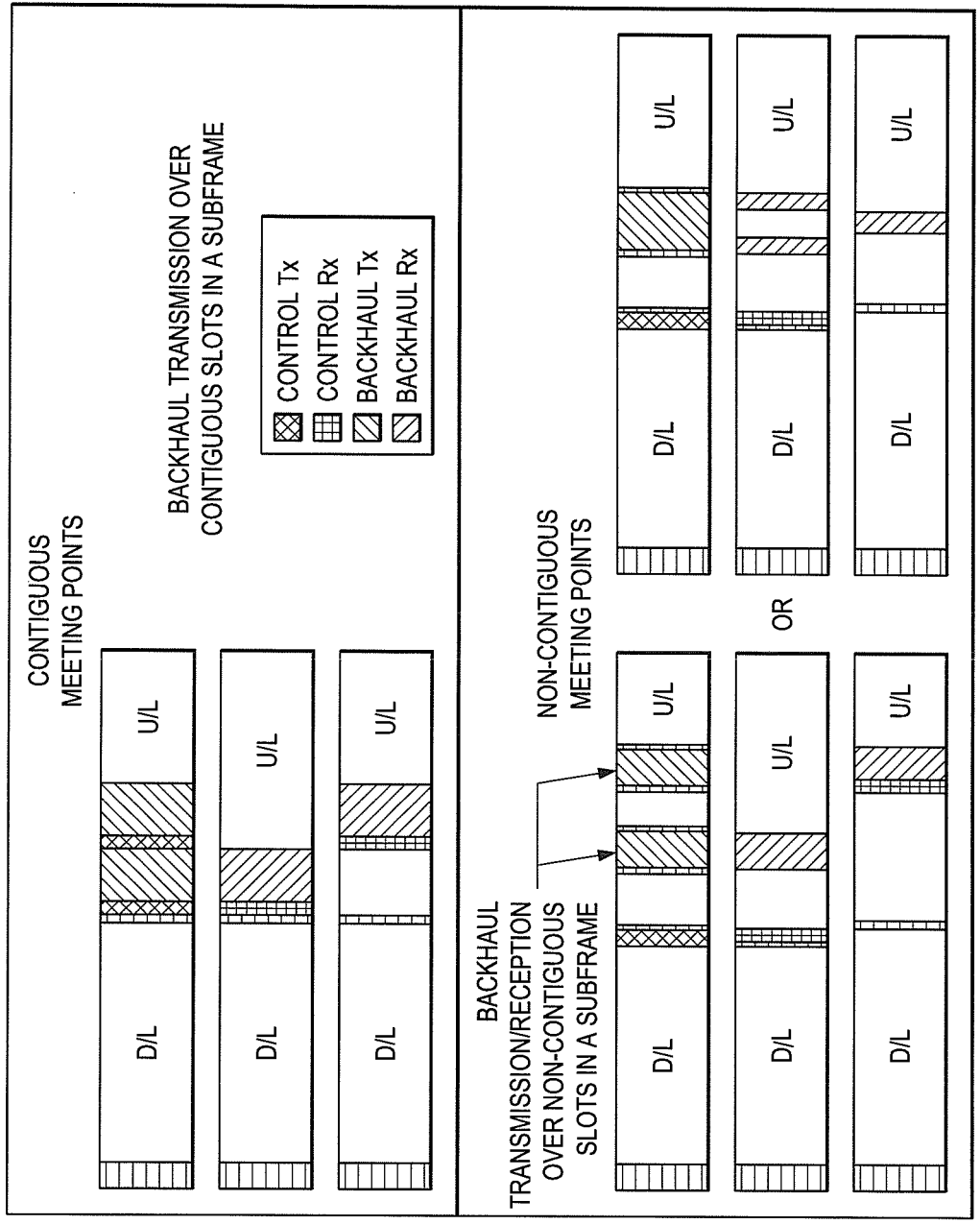
FIG. 16 illustrates an example of contiguous and non-contiguous slots in a subframe for backhaul transmissions according to this disclosure.
Figure 17:
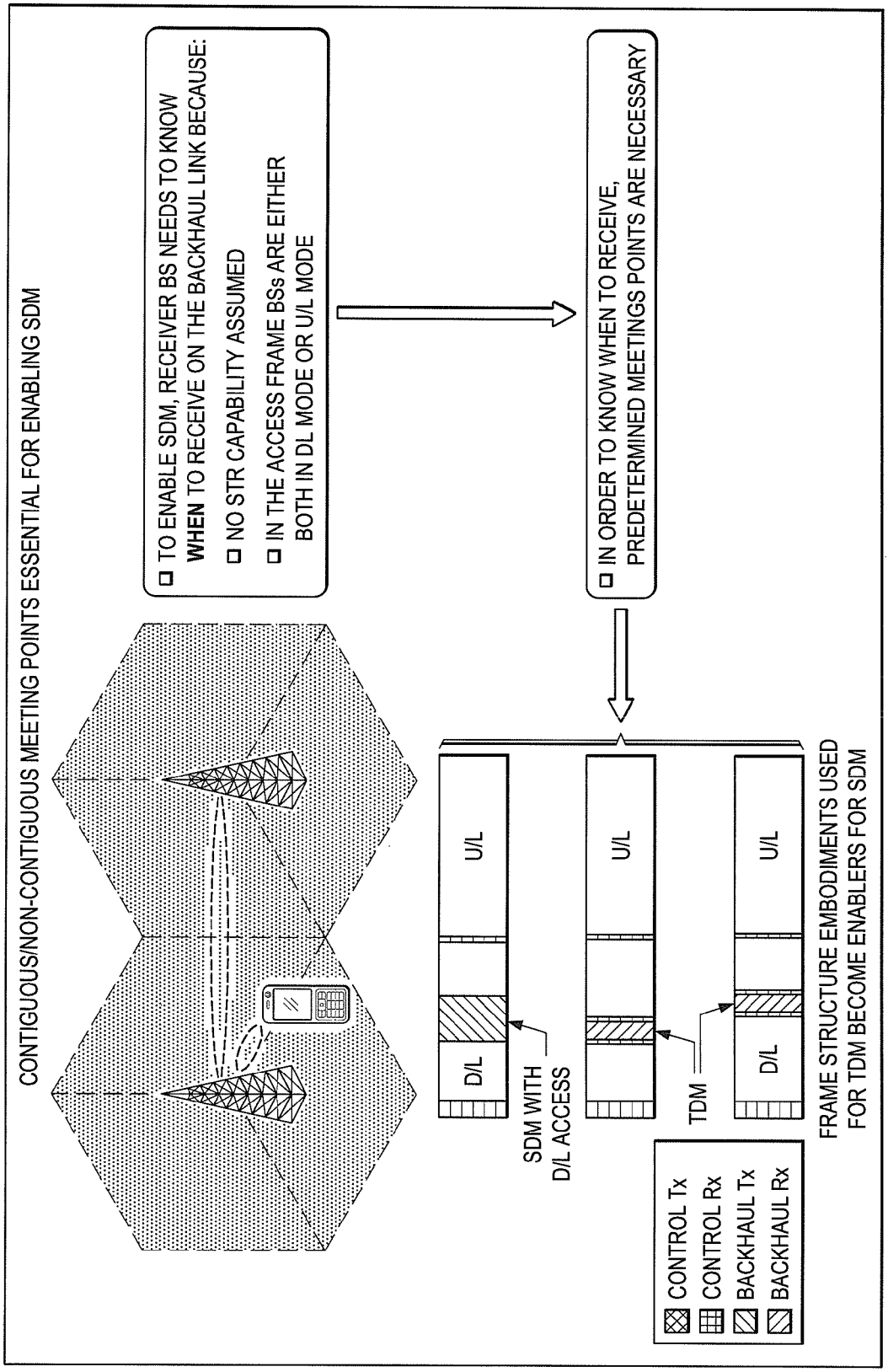
FIG. 17 illustrates an example of contiguous or non-contiguous meeting points for enabling special division multiplexing (SDM) according to this disclosure.
Figure 18:
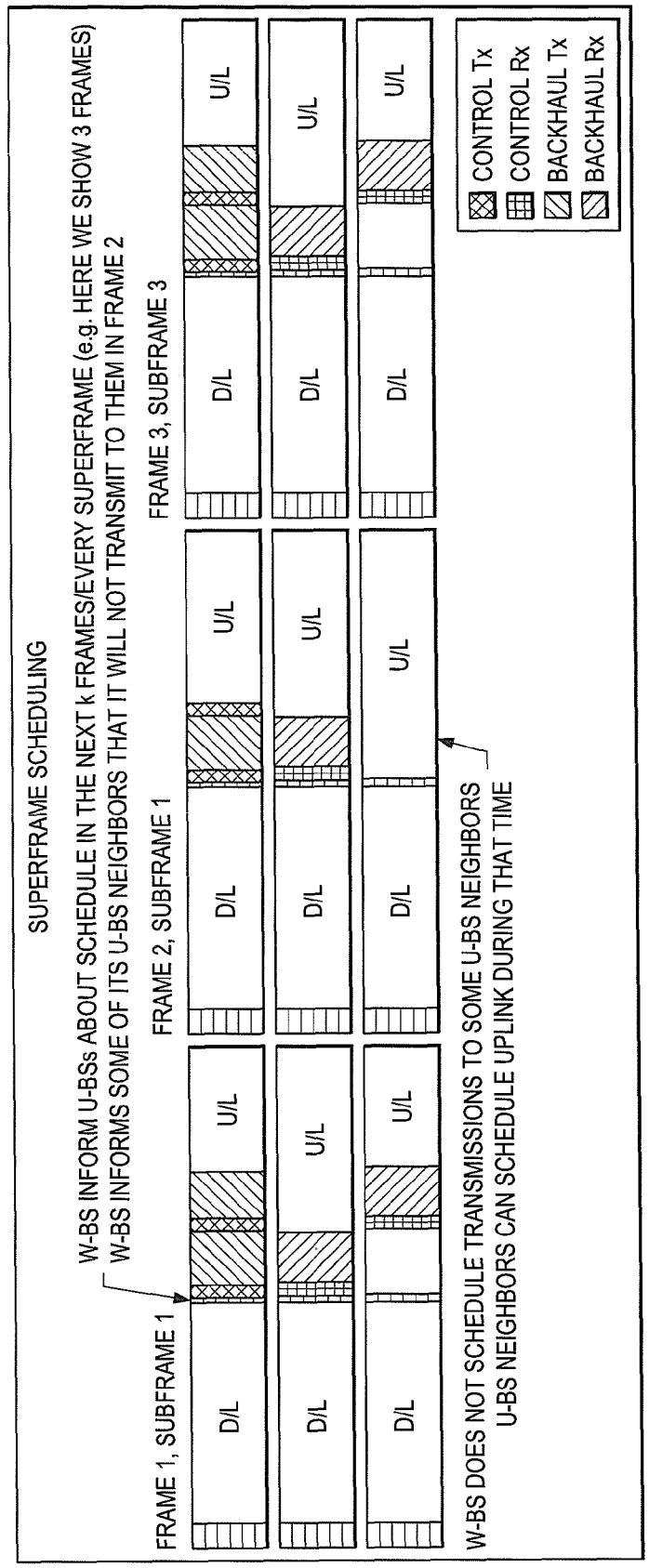
FIG. 18 illustrates an example of superframe scheduling according to this disclosure.
Figure 19:
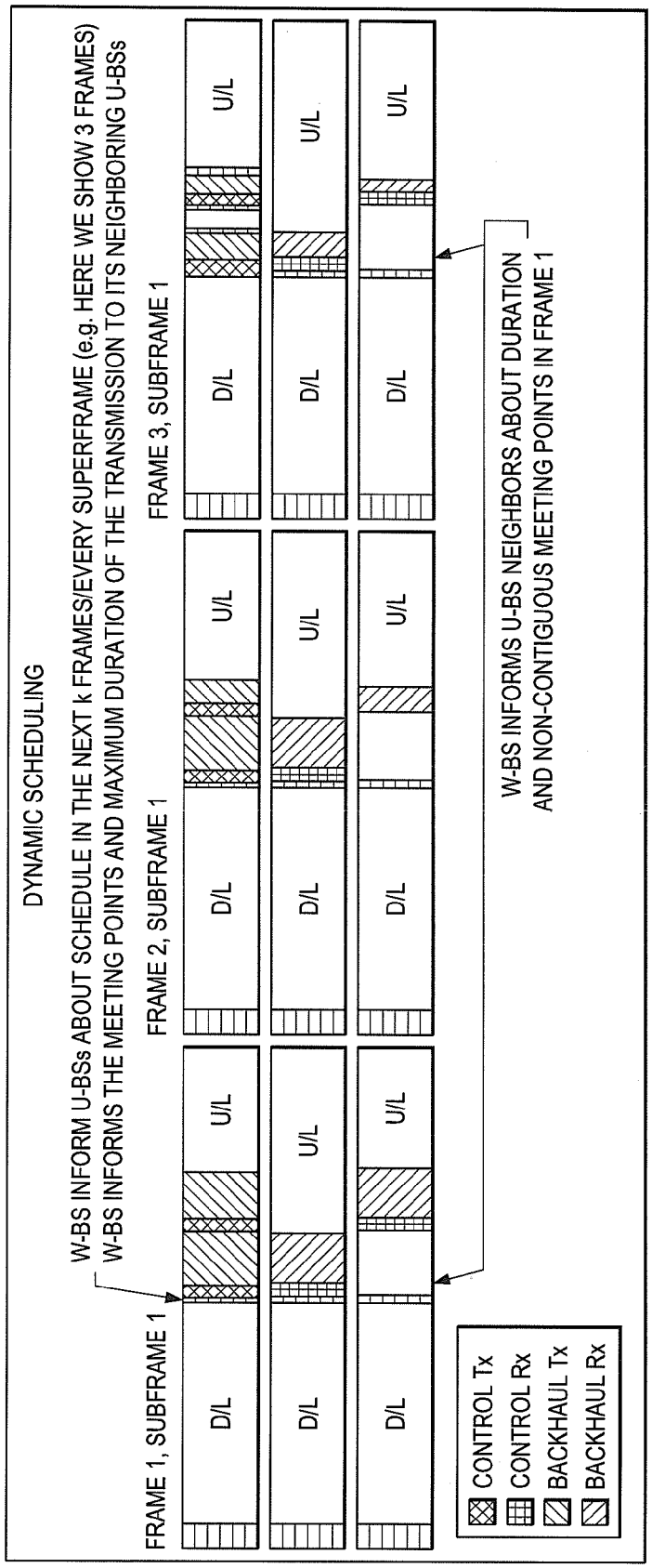
FIG. 19 illustrates an example of dynamic scheduling according to this disclosure.

FIG. 15 illustrates an example of an overall frame structure according to this disclosure. Furthermore, FIGS. 16 through 19 illustrate examples of backhaul transmissions or backhaul transmissions scheduling. For example, FIG. 16 illustrates an example of contiguous and non-contiguous slots in a subframe for backhaul transmissions according to this disclosure. FIG. 17 illustrates an example of contiguous or non-contiguous meeting points for enabling special division multiplexing (SDM) according to this disclosure. FIG. 18 illustrates an example of superframe scheduling according to this disclosure. In an embodiment, superframes have a lower transmission frequency than frames or subframes. FIG. 19 illustrates an example of dynamic scheduling according to this disclosure.

Figure 20:
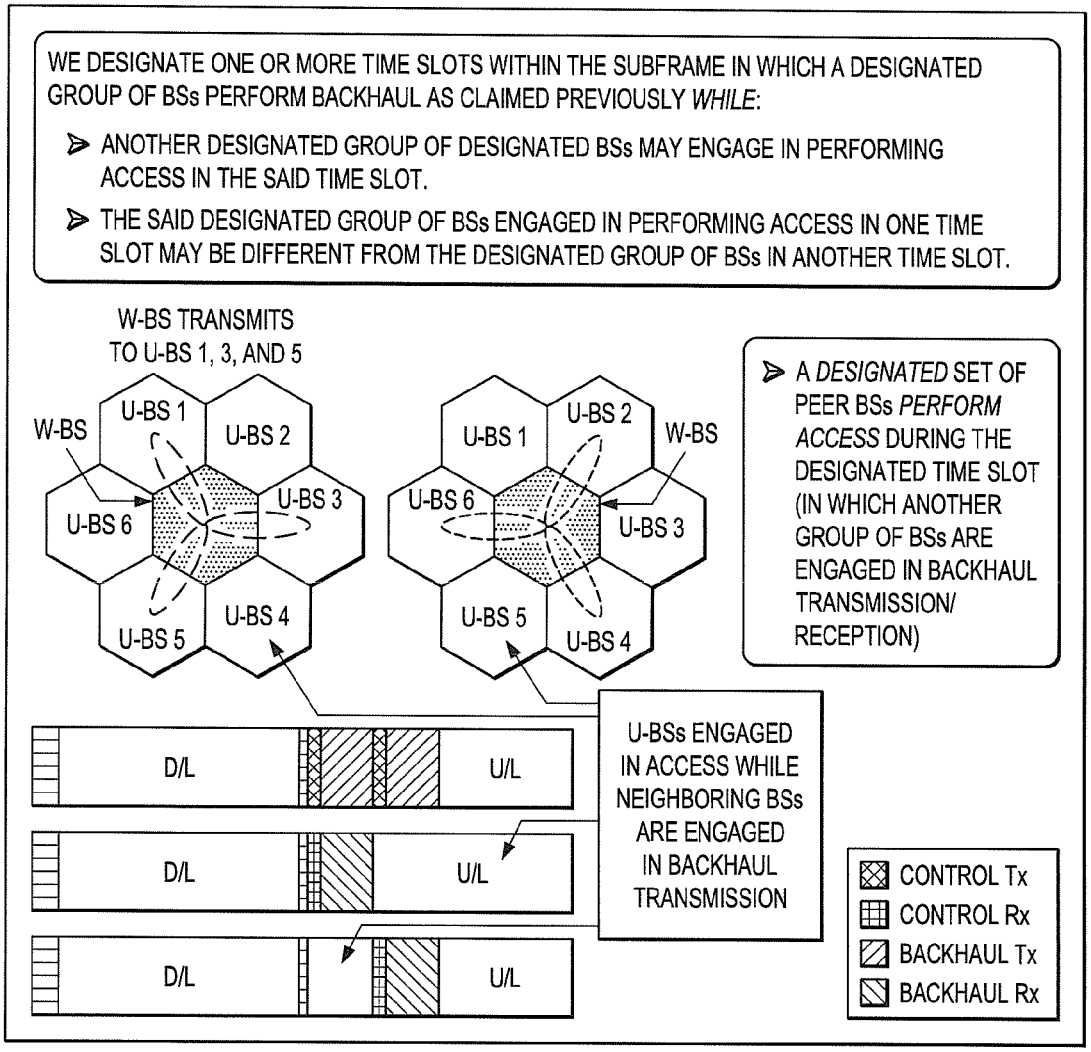
FIG. 20 illustrates yet another example of a Tx-3, Rx-3 scheme for grid-based deployment according to this disclosure.
Figure 21:
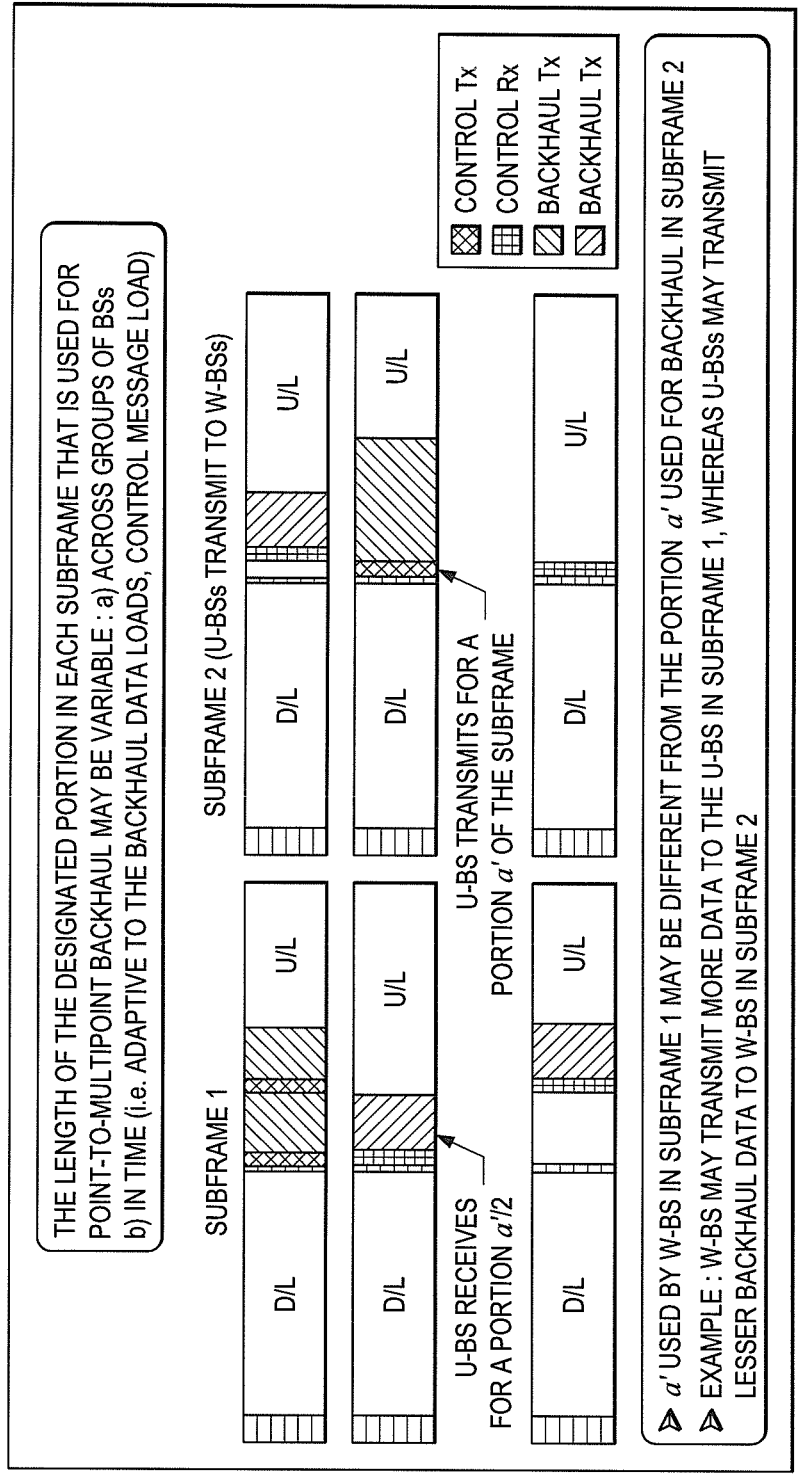
FIG. 21 illustrates an example of a designated portion of a subframe for point-to-multipoint transmission according to this disclosure.

FIG. 20 illustrates yet another example of a Tx-3, Rx-3 scheme for grid-based deployment according to this disclosure. As shown in FIG. 15, one or more time slots can be designated within a subframe in which a designated group of eNBs performs backhaul transmissions while another designated group of eNBs engages in performing access transmissions in the same time slot. In some embodiments, the designated group of eNBs engaged in performing access transmissions in one time slot can be different from the designated group of eNBs in another time slot. Furthermore, FIG. 21 illustrates an example of a designated portion of a subframe for point-to-multipoint transmission according to this disclosure. FIG. 21 illustrates that the designated portions in each subframe that are used for point-to-multipoint backhaul can be varied (such as variable designated portions). In some embodiments, the designated portions can be varied across groups of eNB and/or can be varied in time (such as adaptive to backhaul loads or control message loads).

FIG. 22 illustrates an example of a designated portion of a subframe according to this disclosure. As illustrated in FIG. 22, some transmissions can include backhauling data and, at the same time, some transmissions can include control message exchanges on the fronthaul. Furthermore, at the same time, other transmissions can include both control messages and backhaul data. In some embodiments, the control messages can include access link quality information, user related data, and scheduling maps. FIG. 23 illustrates an example of eNBs in point-to-point backhaul transmission engagement according to this disclosure. As illustrated in FIG. 23, a designated group of eNBs engaged in point-to-point backhaul transmissions to another designated group of eNBs can transmit backhaul data between the eNBs using a wireless X2 interface.

Figure 24:
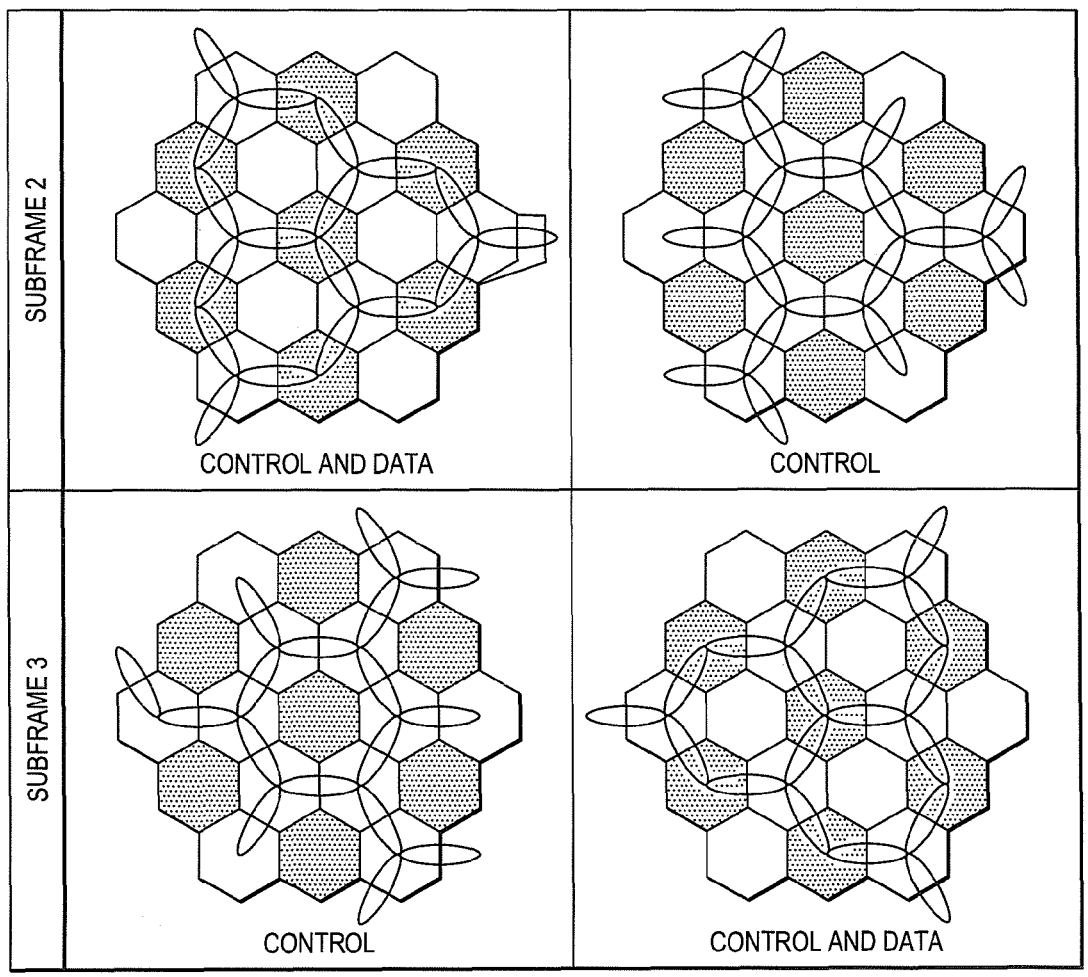
FIG. 24 illustrates an example of X2 transmissions utilizing one or more different subframes according to this disclosure.

FIG. 24 illustrates an example of X2 transmissions utilizing one or more different subframes according to this disclosure. Specifically, FIG. 24 illustrates an embodiment of X2 transmissions utilizing subframes 2 and 3.

A method of executing X2 transmissions can include, in subframe 1, a wired 4G eNB transmitting to all its neighboring eNBs (such as six neighboring eNBs). In some embodiments, all neighboring eNBs can be U-eNBs. When all neighboring eNBs are U-eNBs, both control messages and backhaul data can be transmitted to the U-eNBs. While the duration of control transmissions (such as of control messages) can be negligible, the duration of backhaul data transmissions can be equally divided between type 1 and type 2 U-eNBs.

The method can also include, in subframe 2, each type 1 U-eNB transmitting to all its neighboring eNBs (such as six neighboring eNBs). In some embodiments, the type 1 U-eNBs can initially transmit only control messages to type 2 neighboring eNBs (such as three type 2 neighboring eNBs). Subsequently, in some embodiments, the type 1 U-eNBs can transmit control messages and data to neighboring W-eNBs.

The method can further include, in subframe 3, each type 2 U-eNB transmitting to all its neighboring eNBs (such as six neighboring eNBs). In some embodiments, the type 2 U-eNBs can initially transmit only control messages to type 1 neighboring eNBs (such as three type 1 neighboring eNBs). Subsequently, in some embodiments, the type 2 U-eNBs can transmit control messages and data to neighboring W-eNBs.

In some embodiments, at the end of subframe 3, all eNBs can finish exchanging at least one round of control messages with their neighboring eNBs. With backhaul data, the duration of backhaul transmissions from the U-eNBs (such as with subframe 2 and subframe 3) can be twice the duration of backhaul transmissions received by the U-eNBs. Furthermore, in some cases, the backhaul traffic directed to a U-eNB can be higher (such as twice) the backhaul traffic leaving the U-eNB to the core network. In order to increase the backhaul throughput (such as when high backhaul traffic exists), a fraction of the uplink portion of subframes 4 and 5 can be used exclusively for delivering backhaul traffic to cells with U-eNBs. For example, a W-eNB can transmit backhaul data in subframe 4 to at least some neighboring type 1 U-eNBs (such as three type 1 neighboring U-eNBs). Furthermore, a W-eNB can transmit backhaul data in subframe 5 to at least some neighboring type 2 U-eNBs (such as three type 2 neighboring U-eNBs). In some embodiments, at the end of subframe 5, type 1 U-eNBs and type 2 U-eNBs may have received backhaul data for a fraction of time $$\alpha' + \frac{\alpha'}{2} = \frac{3}{2}\alpha',$$

which can be 1.5 times the fraction of time backhaul traffic is transmitted by the U-eNBs.

The access capacity trade-offs of the proposed X2 scheduling schemes can be analyzed based on the rate of the X2 links and the duration for which the X2 links are engaged in backhaul. Furthermore, the uplink and downlink access capacities of a U-eNB cannot exceed the overall throughput achieved over the backhaul link, which can be expressed as:

$$c_{a_u} \leq c_{f_u} \quad (1)$$

$$c_{a_d} \leq c_{f_d} \quad (2)$$

The quantities $t_{x_u}$ and $t_{x_d}$ can be obtained using the frame structure associated with the Tx-3, Rx-3 scheme. As noted above, in some embodiments, type 1 U-eNBs and type 2 U-eNBs can receive backhaul for a fraction of time $$\alpha' + \frac{\alpha'}{2} = \frac{3}{2}\alpha',$$

which can be 1.5 times the fraction of time backhaul traffic is transmitted by the U-eNBs.

$$t_{x_u} = \alpha' \cdot t_{frame} = \frac{1}{5}\alpha \cdot t_{frame} \quad (3)$$

$$t_{x_d} = \frac{9}{2}\alpha' \cdot t_{frame} = \frac{1}{5}\alpha \cdot t_{frame} \quad (4)$$

The overall backhaul throughput achieved for a cell with a non-fibered eNB (such as a U-eNB) may depend not only on the duration and transmission rate of an X2 link but also on the number of X2 links that can be engaged in X2 backhaul during each X2 transmission or reception opportunity as illustrated below in TABLE 3.

TABLE 3

| $r_f$(X2 link transmission rate)(Gb/s) | $\alpha$ | $c_{a_d}$ | $c_{a_u}$ | $c_{a_d} + c_{a_u}$ |
|---|---|---|---|---|
| 3 | 0.25 | 0.675 | 0.45 | 1.125 |
| 3 | 0.18 | 0.462 | 0.308 | 0.77 |
| 3 | 0.125 | 0.3375 | 0.225 | 0.5625 |
| 6 | 0.25 | 1.35 | 0.9 | 2.25 |
| 6 | 0.185 | 0.924 | 0.616 | 1.54 |
| 6 | 0.138 | 0.675 | 0.45 | 1.125 |

Since at most three X2 links of each U-eNB can be engaged simultaneously, the overall backhaul throughput for a U-eNB can be expressed as:

$$c_{f_u} = \Sigma_{k=1}^3 k \cdot r_f t_{k_u} \quad (5)$$

$$c_{f_d} = \Sigma_{k=1}^3 k \cdot r_f t_{k_d} \quad (6)$$

where $t_{k_d}$ and $t_{k_u}$ are the durations within each frame that a U-eNB can engage k X2 links simultaneously in uplink and downlink directions. In the Tx-3, Rx-3 scheme as illustrated in FIG. 24, a U-eNB can communicate over three X2 links in each opportunity for X2 transmission or reception. Consequently, the overall throughout of backhaul data received and transmitted by the U-eNB can be expressed by:

$$c_{f_d} = 3 \cdot r_f \cdot \frac{3}{2}\alpha' = \frac{9}{10} r_f \cdot \alpha \quad (7)$$

$$c_{f_u} = 3 \cdot r_f \cdot \alpha' = \frac{3}{5} r_f \cdot \alpha \quad (8)$$

The access capacity achievable in the uplink and downlink can be calculated for different values of $\alpha$ and $r_f$ as illustrated below in TABLE 4.

TABLE 4

| $r_f$(X2 link transmission rate)(Gb/s) | $\alpha$ | $c_{a_d}$ | $c_{a_u}$ | $c_{a_d} + c_{a_u}$ |
|---|---|---|---|---|
| 3 | 0.25 | 1.8 | 0.45 | 2.25 |
| 3 | 0.18 | 1.296 | 0.324 | 1.62 |
| 3 | 0.125 | 0.9 | 0.225 | 1.125 |
| 6 | 0.25 | 3.6 | 0.9 | 4.5 |
| 6 | 0.18 | 2.592 | 0.648 | 3.24 |
| 6 | 0.125 | 1.8 | 0.45 | 2.25 |

The Tx-3, Rx-3 scheme with a fiber density of ⅓ can be used to develop schemes for different fiber densities. As illustrated in FIG. 24, the Tx-3, Rx-3 scheme can be used to exchange control messages with neighboring eNBs in the first three subframes. In these embodiments, backhaul traffic can be transmitted over the X2 link whenever a U-eNB communicates with a W-eNB. The portions of subframe 4 and subframe 5 used for X2 Tx/Rx can be used to deliver backhaul data to the U-eNBs. For example, the Tx-3, Rx-3 scheme in subframes 1-3 can be used to exchange control messages with all neighboring eNBs, and backhaul traffic can be transmitted whenever a U-eNB communicates with a W-eNB. Furthermore, subframes 4 and 5 can be used to maximize backhaul traffic to the U-eNBs.

Figure 25:
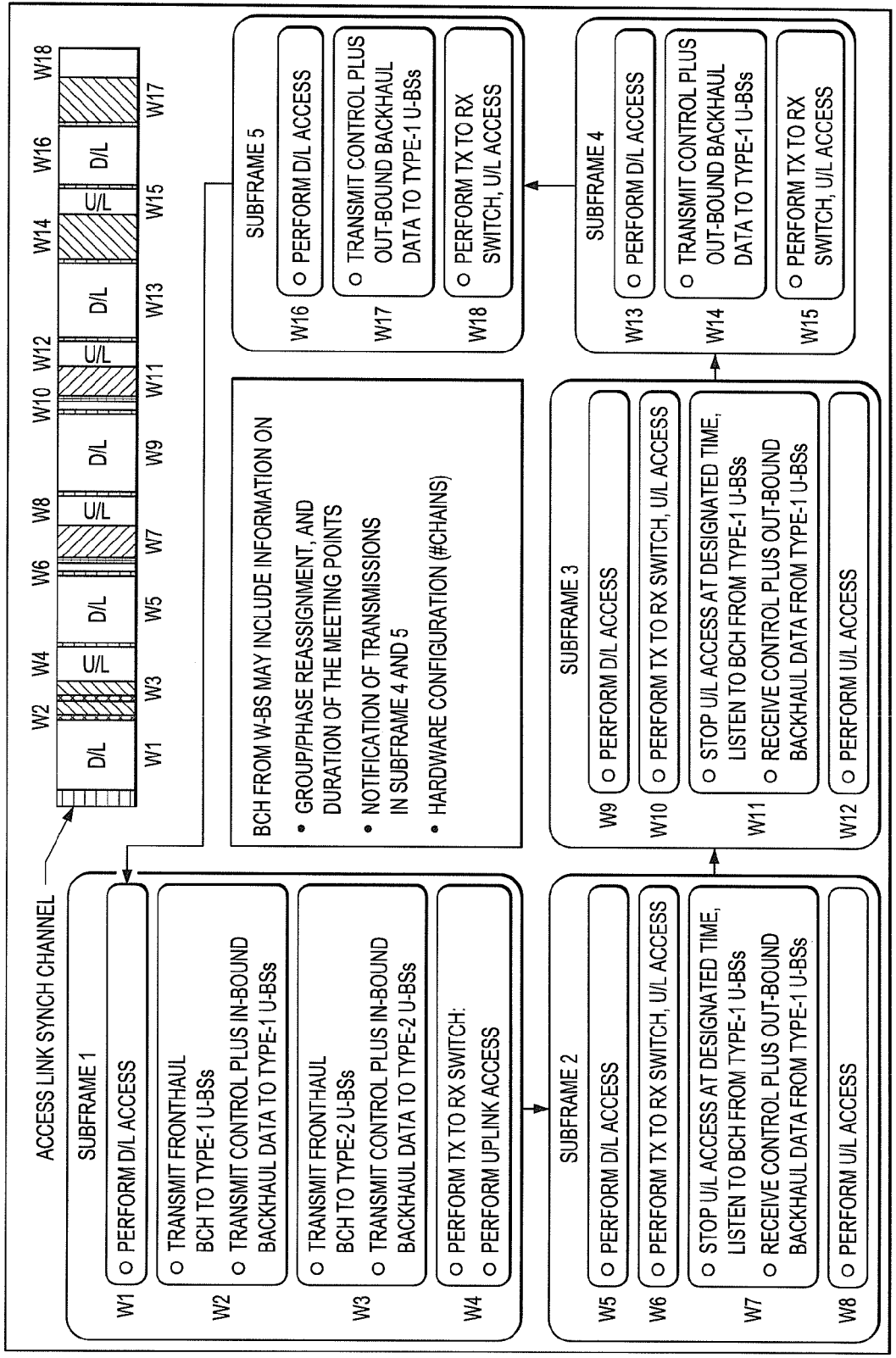
FIG. 25 illustrates an example of a wired eNB operation with a first frame structure of type-1 eNBs according to this disclosure.
Figure 26:
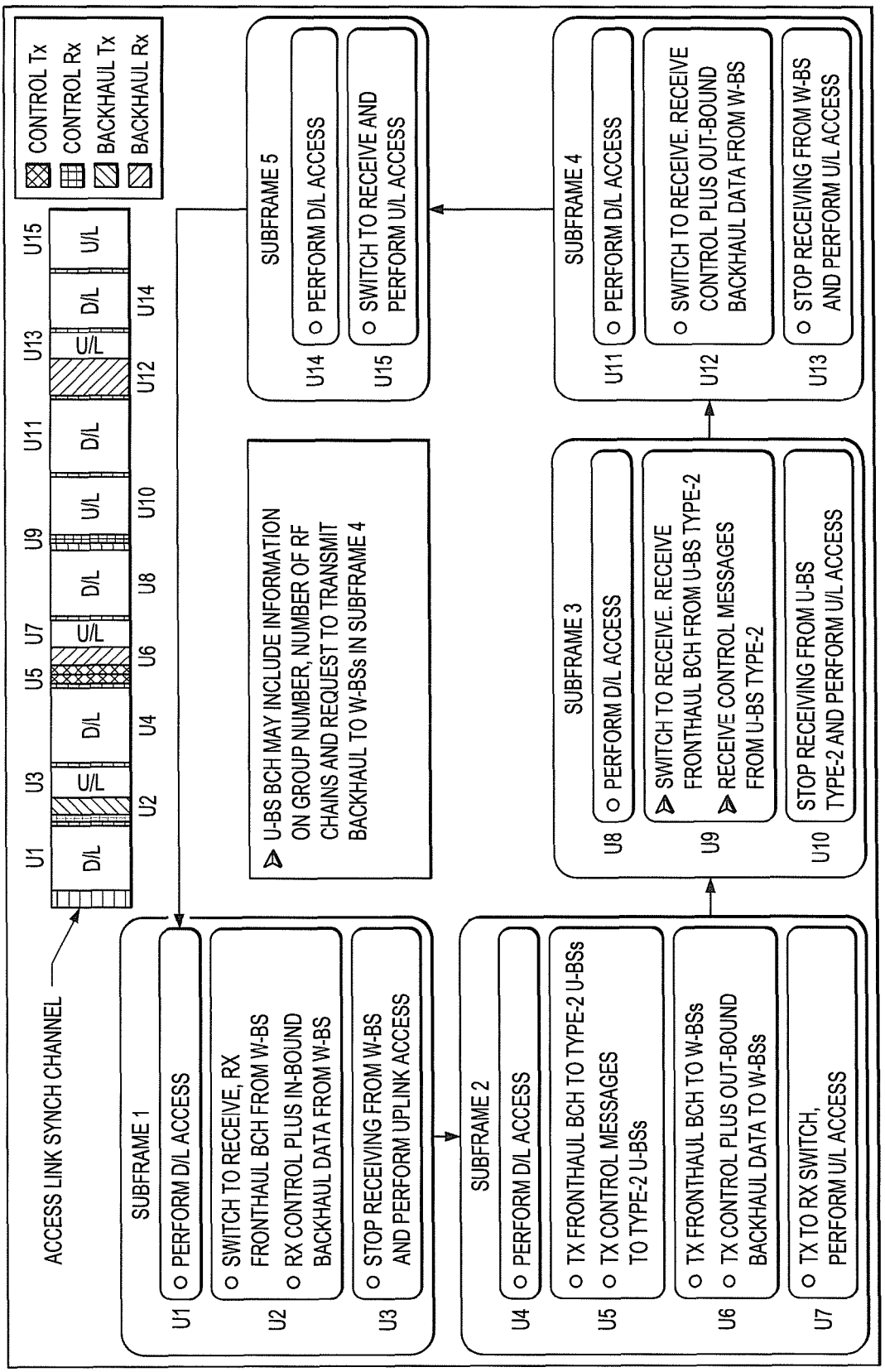
FIG. 26 illustrates an example of a type-2 U-eNB operation with a second frame structure of type-2 eNBs according to this disclosure.
Figure 27:
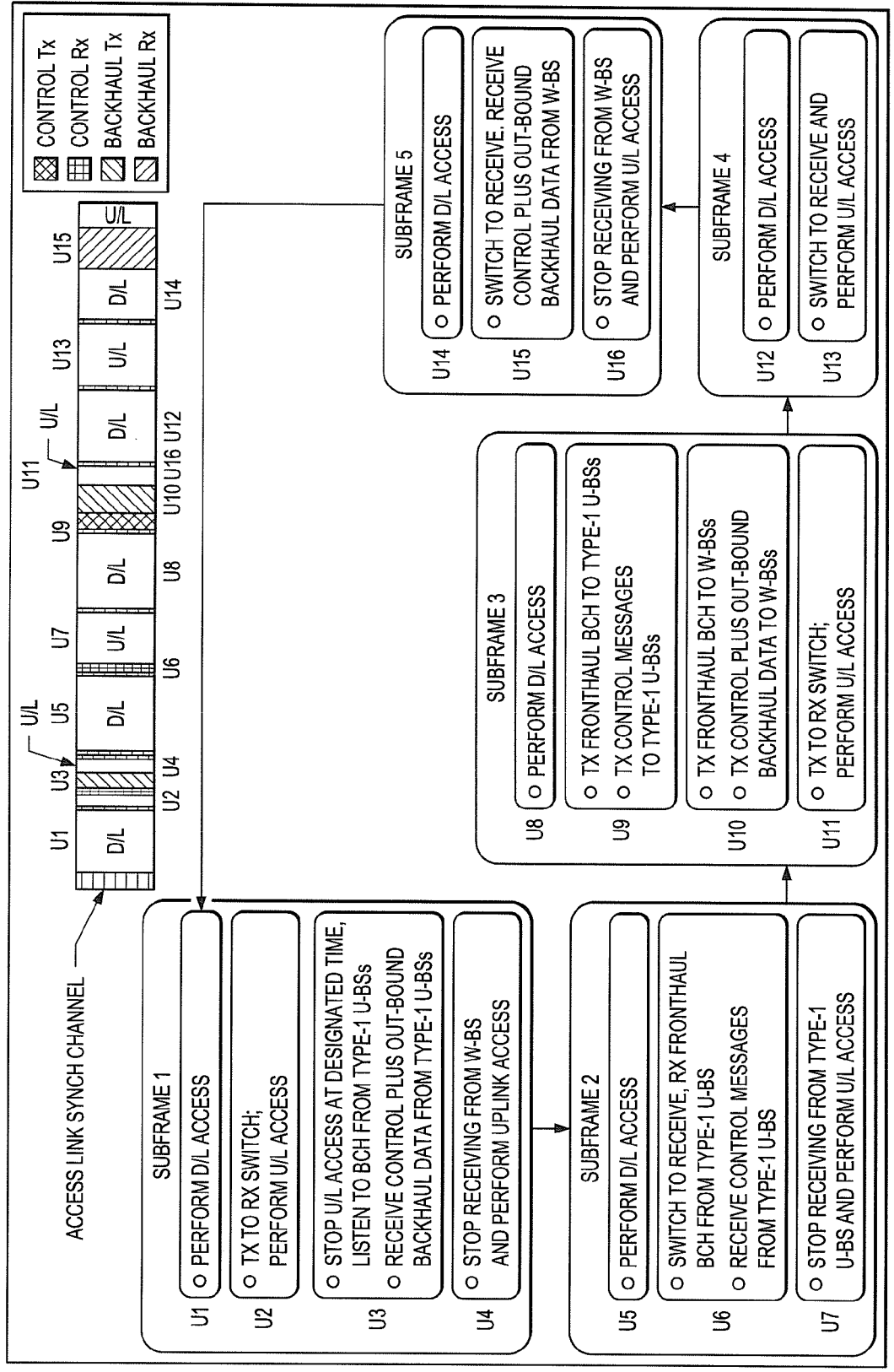
FIG. 27 illustrates an example of a type-2 U-eNB operation with a third frame structure of type-3 eNBs according to this disclosure.

FIG. 25 illustrates an example of a wired eNB operation with a first frame structure of type-1 eNBs according to this disclosure. FIG. 26 illustrates an example of a type-2 U-eNB operation with a second frame structure of type-2 eNBs according to this disclosure. FIG. 27 illustrates an example of a type-2 U-eNB operation with a third frame structure of type-3 eNBs according to this disclosure.

Figure 28:
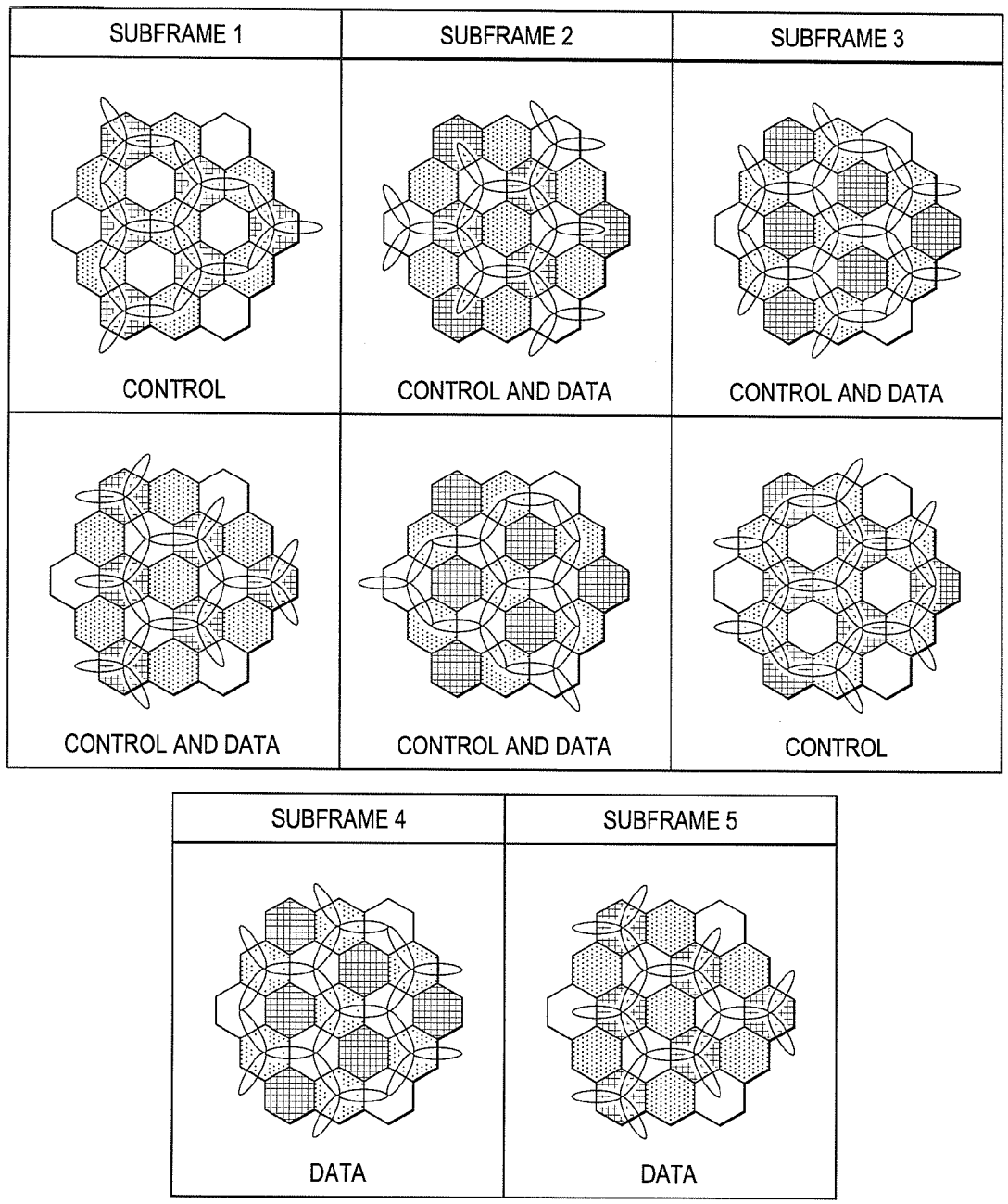
FIG. 28 illustrates an example of Tx-3, Rx-3 scheme B with a fiber density of ⅔ according to this disclosure.

Access capacity trade-offs can be evaluated when the fiber density is increased to ⅔. The three eNB classes can be identified as 4G W-eNBs, 5G W-eNBs, and U-eNBs, respectively. FIG. 23 illustrates an example of Tx-3, Rx-3 scheme B with a fiber density of ⅔ according to this disclosure. As illustrated in FIG. 28, each W-eNB can have three U-eNB neighbors.

Figure 29:
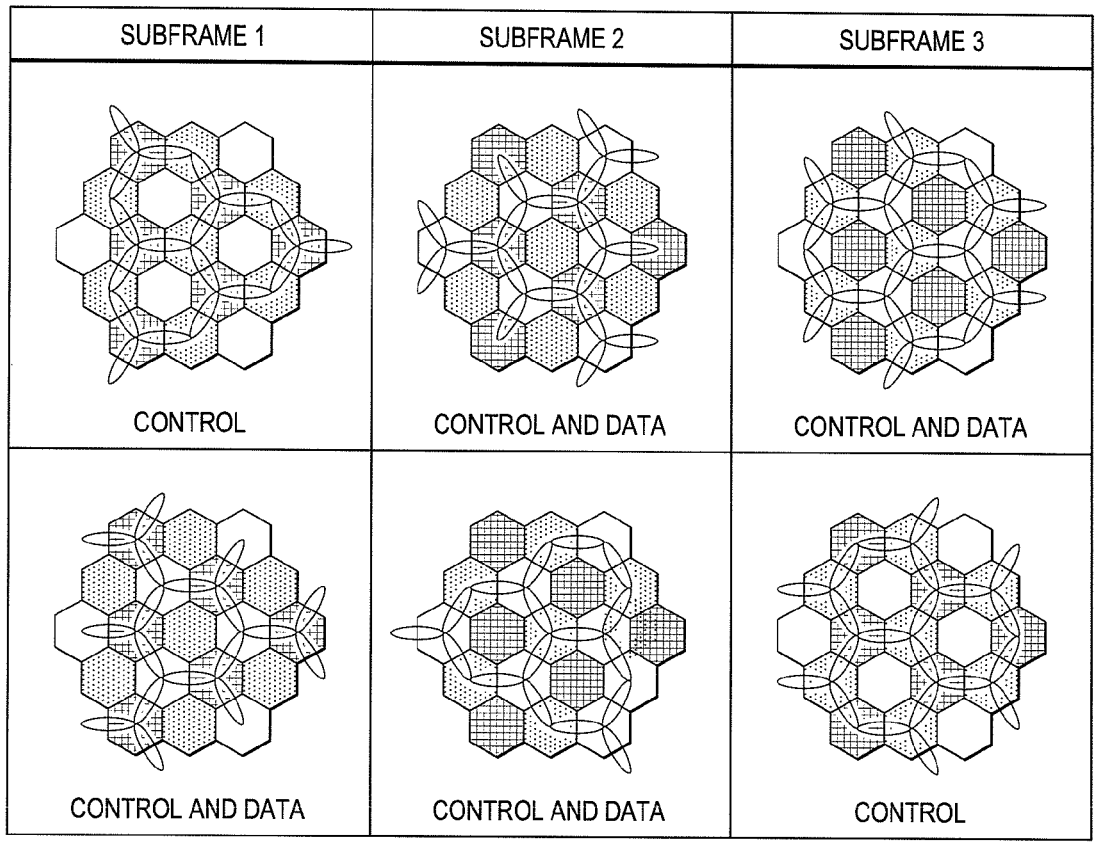
FIG. 29 illustrates an example of Tx-3, Rx-3 scheme B with a fiber density of ⅔ for subframes 1, 2, and 3 according to this disclosure.
Figure 30:
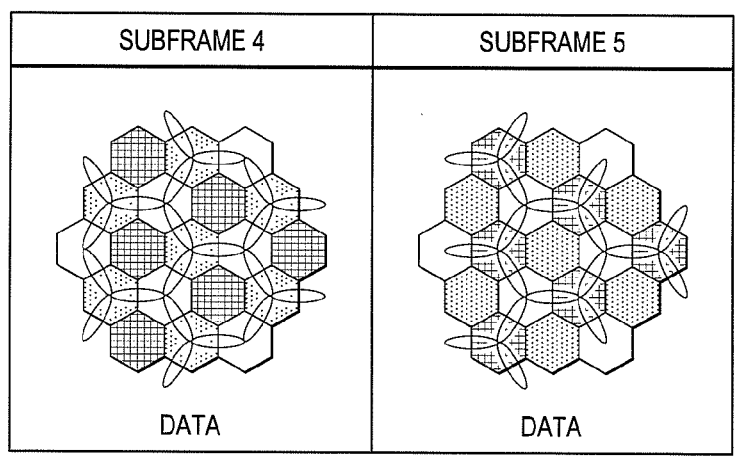
FIG. 30 illustrates an example of Tx-3, Rx-3 scheme B with a fiber density of ⅔ for subframes 4 and 5 according to this disclosure.

In some embodiments, in each subframe, at least one of the eNB classes can transmit to every neighboring eNB (such as six neighboring eNBs) by engaging three X2 links at any given time. FIG. 29 illustrates an example of a Tx-3, Rx 3 scheme. Specifically, FIG. 29 illustrates an example of a Tx-3, Rx 3 scheme used over subframes 1-3. Subframes 4 and 5 can be reserved for transmitting backhaul data to U-eNBs. FIG. 30 illustrates an example where a 4G W-eNB can transmit backhaul data in subframe 4 to neighboring U-eNBs (such as three neighboring U-eNBs), while a 5G W-eNB can transmit backhaul data in subframe 5 to neighboring U-eNBs (such as three neighboring U-eNBs).

The expressions for overall backhaul throughput are evaluated using the frame structure illustrated in FIGS. 29 and 30 and can be expressed as:

$$c_{f_d} = (3 \cdot \alpha' + 3 \cdot \alpha' + 3 \cdot \alpha' + 3 \cdot \alpha') \cdot r_f = \frac{12}{5} \alpha \cdot r_f \quad (11)$$

$$c_{f_u} = 3\alpha' \cdot r_f \cdot t_{frame} = \frac{3}{5} \alpha \cdot r_f \quad (12)$$

The cumulative backhaul throughput $c_{f_d}+c_{f_u}$ can be evaluated to be $3 \cdot \alpha \cdot r_f$, which can be twice the cumulative backhaul throughput achieved under a fiber density of ⅓. Thus, in some embodiments, doubling the fiber density doubles the access capacities of the U-eNBs. TABLE 5 illustrates access capacities under a fiber density of ⅔ for variable X2 transmission rates.

TABLE 5

| $r_f$(X2 link transmission rate)(Gb/s) | α | $c_{a_d}$ | $c_{a_u}$ | $c_{a_d}+c_{a_u}$ |
|---|---|---|---|---|
| 3 | 0.25 | 1.8 | 0.45 | 2.25 |
| 3 | 0.18 | 1.296 | 0.324 | 1.62 |
| 3 | 0.125 | 0.9 | 0.225 | 1.125 |
| 6 | 0.25 | 3.6 | 0.9 | 4.5 |
| 6 | 0.18 | 2.592 | 0.648 | 3.24 |
| 6 | 0.125 | 1.8 | 0.45 | 2.25 |

The schemes disclosed in this patent document can enable the dual functions of control message exchanges and backhauling access traffic. However, latency trade-offs can also exist with these schemes. Often, latency requirements for control message exchanges can be more stringent. Thus, latency can be defined as the time instant by which a control message is available to transmit at an eNB up to the time at which the eNB has completed exchanging messages with all neighboring type 1 eNBs. Based on this definition, latency can be characterized by the following expression:

Latency (L)=Packetization and processing delay at Tx end+Packet transfer delay+Packetization and processing delay at the Rx end.

Figure 31A:
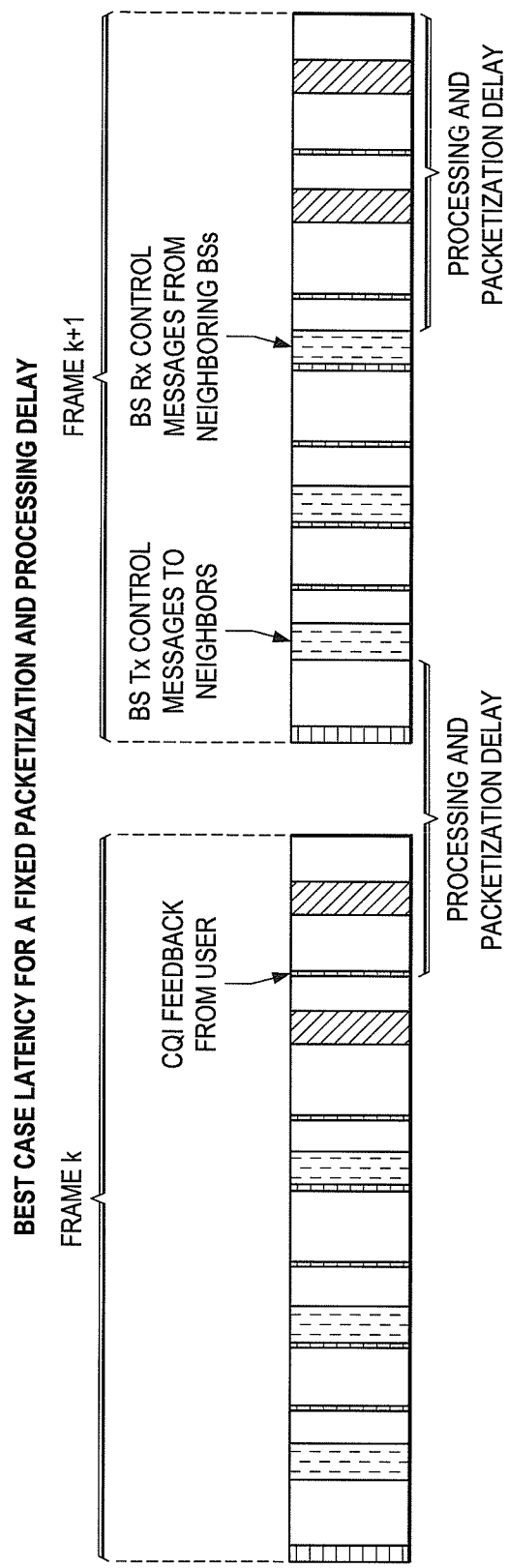
FIG. 31A illustrates an example of best case latency scenarios for the TX-3, Rx-3 based schemes according to this disclosure.

In the Tx-3, Rx-3 based schemes, all eNBs can finish exchanging control messages with each other at the end of subframe 3. The best case latency can then be evaluated by assuming that the control messages of an eNB can be ready just before the eNB transmits over X2 links and hence can undergo no scheduling latency. FIG. 31A illustrates an example of best case latency scenarios for the TX-3, Rx-3 based schemes according to this disclosure. Specifically, FIG. 31A illustrates an embodiment of the best case latency of a channel quality indication (CQI) for fixed packetization and processing delays. The best case scheduling latency can be expressed as $L=2t_{pp}+3t\_subframe$.

Figure 31B:
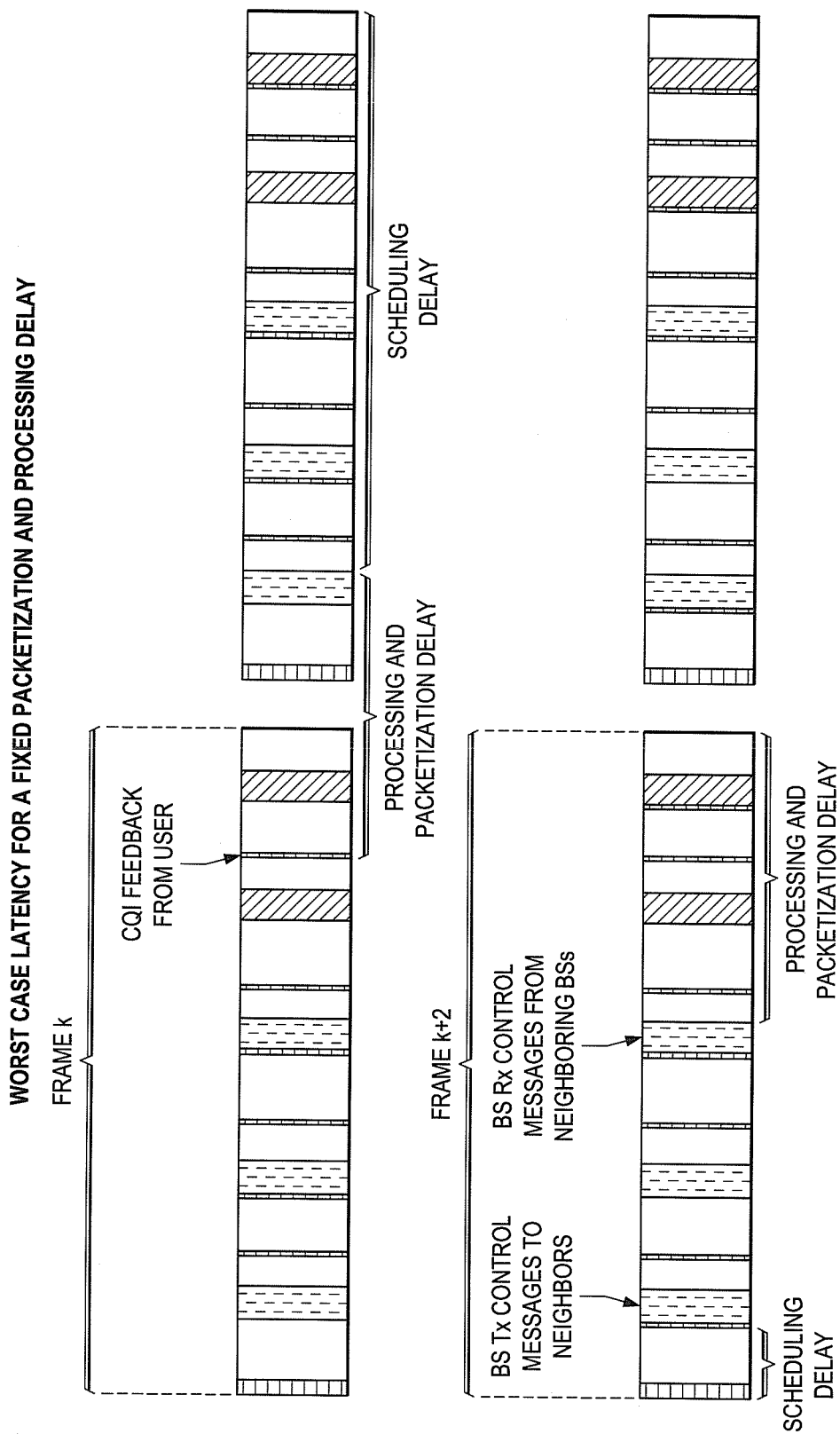
FIG. 31B illustrates an example of worst case latency scenarios for the TX-3, Rx-3 based schemes according to this disclosure.

FIG. 31B illustrates an example of worst case latency scenarios for the TX-3, Rx-3 based schemes according to this disclosure. Specifically, FIG. 31B illustrates an embodiment of the worst case latency of a CQI for fixed packetization and processing delays. In some embodiments, the worst case latency can occur when the control message has to undergo a scheduling latency of one frame before it is transmitted as shown for type 1 eNBs in FIG. 31B. It can be observed from FIGS. 26A and 26B that the average scheduling latency due to the Tx-3, Rx-3 based schemes can be no more than half the frame duration, and the packetization and processing delay can be the dominant component of the latency. TABLE 6 illustrates latency values for different values of packet processing times assuming $t_{subframe}=1$ ms.

TABLE 6

|  | Processing time = 1 ms | Processing time = 2 ms | Processing time = 3 ms |
|---|---|---|---|
| Best Latency Case | 5.5 | 7.5 | 9.5 |
| Worst Latency Case | 10.5 | 12.5 | 14.5 |

Figure 32:
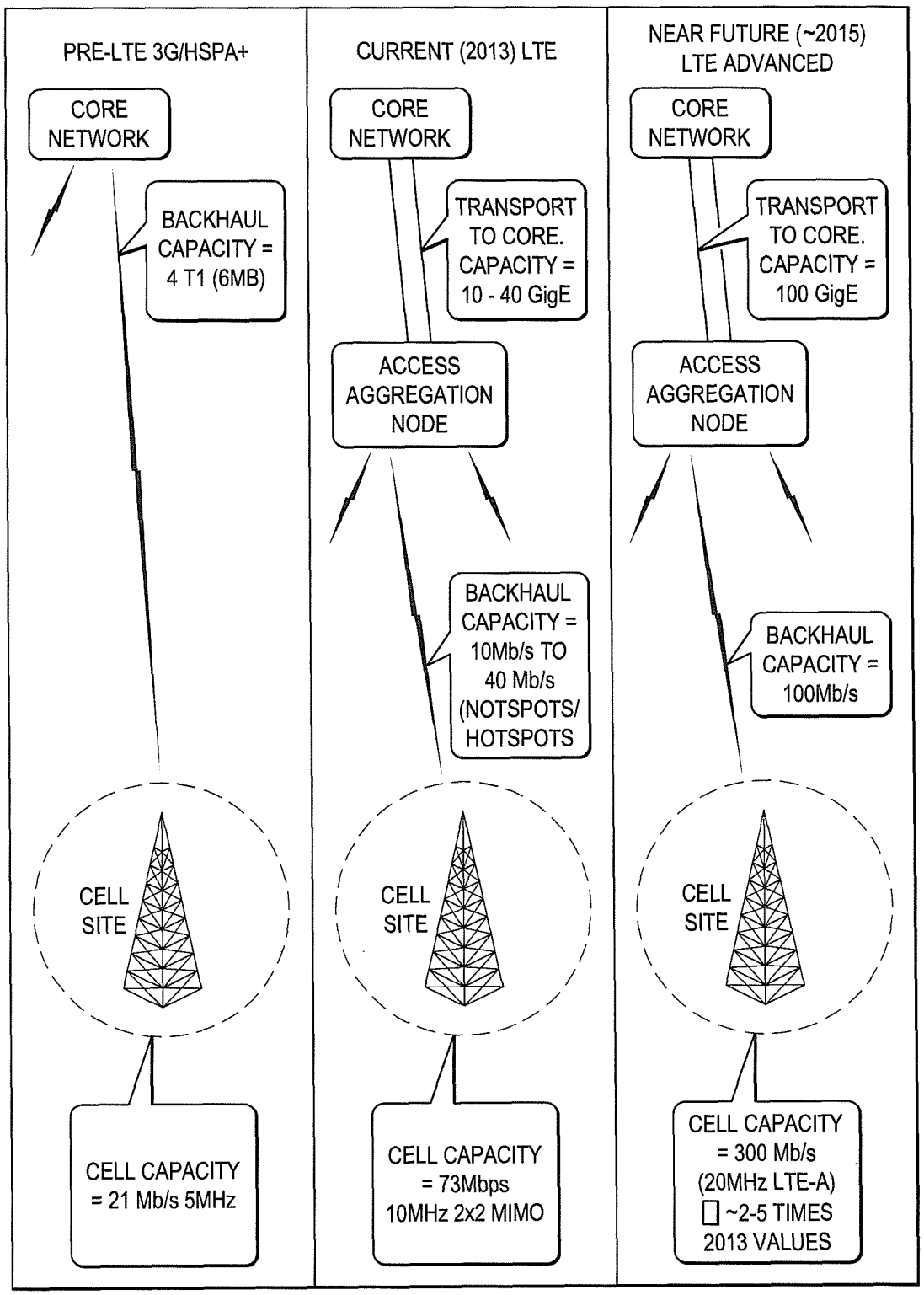
FIG. 32 illustrates an example of backhaul transmissions in a point-to-multipoint system according to this disclosure.

FIG. 32 illustrates an example of backhaul transmissions in a point-to-multipoint system according to this disclosure. Packet data belonging to different mobile streams in each sector can be multiplexed and aggregated at the eNB. Aggregated backhaul data can be demultiplexed and sent over a plurality of backhaul links via point-to multipoint backhaul transmissions.

As discussed here, a TDM-based baseline approach can be used to demonstrate the feasibility of in-band X2 to transport backhaul data. In some embodiments, the TDM-based approaches discussed here can be extended to grid-based deployment scenarios and more heterogeneous deployment scenarios. These scenarios can also be analyzed for capacity trade-offs.

In some embodiments, some of the assumptions on hardware capabilities can also be relaxed. For example, a natural extension of the TDM-based approach can include scenarios where more than just X2 links are supported within a sector using SDM. In this example, an eNB can transmit to every neighboring eNB (such as six neighboring eNBs) simultaneously. Furthermore, hardware capabilities can be enabled to allow the SDM of X2 and access links to simultaneous transmit and receive (such as full-duplex) in each panel or over adjacent panels.

Figure 33:
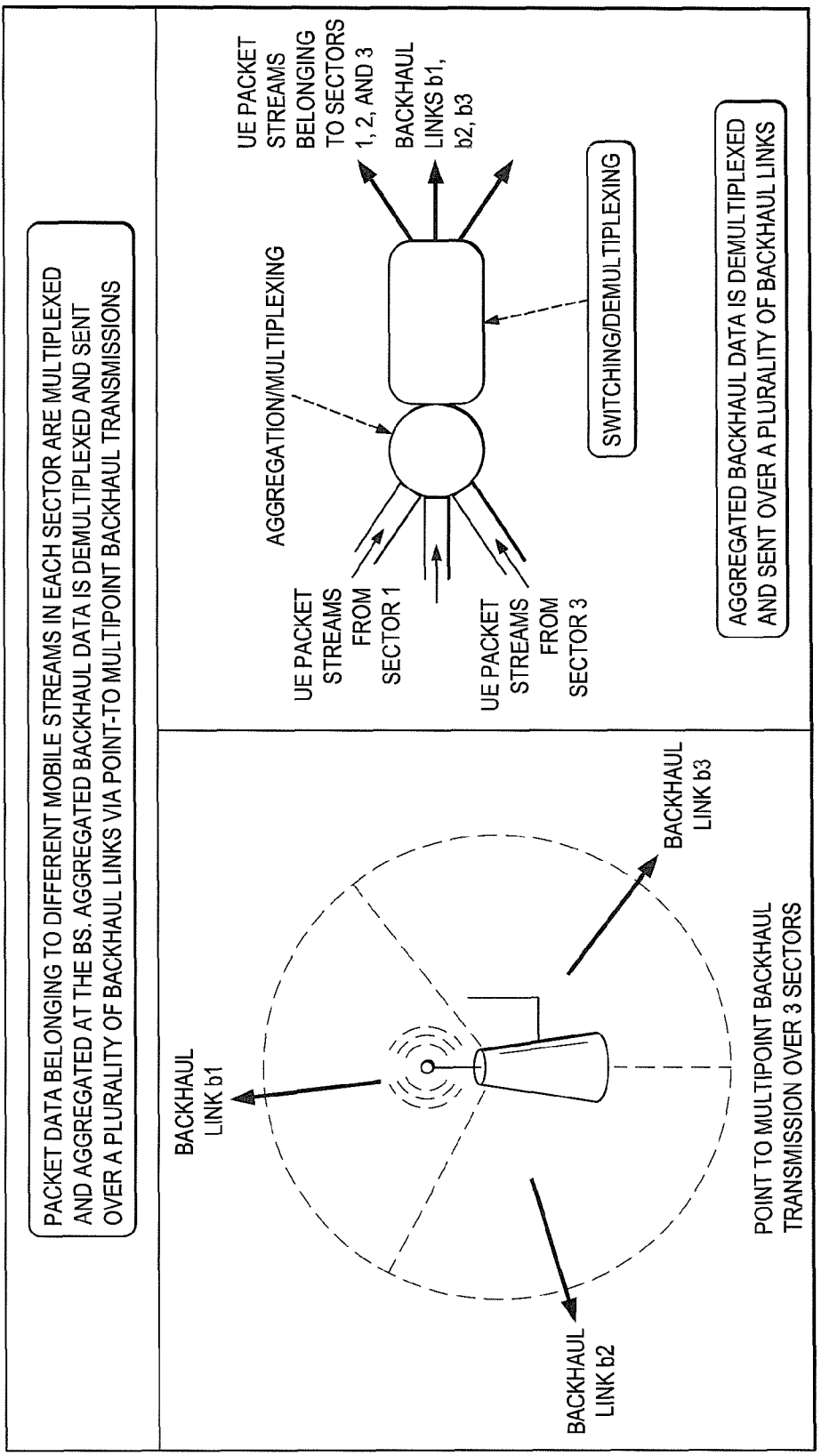
FIG. 33 illustrates an example of potential backhaul needs both current and future according to this disclosure.

As discussed here, a TDM-based baseline approach for transporting backhaul using in-band X2 links could also be used to address backhaul needs, such as for next-generation mobile networks. Access capacity trade-offs were analyzed with TDM-based backhauling schemes for different fiber backhaul densities. FIG. 33 illustrates an example of potential backhaul needs both current and future according to this disclosure. For example, based on the cell capacities for LTE and LTE-A, future access capacities can be as much as five to ten times the estimated capacities of LTE-A networks.

Figure 34:
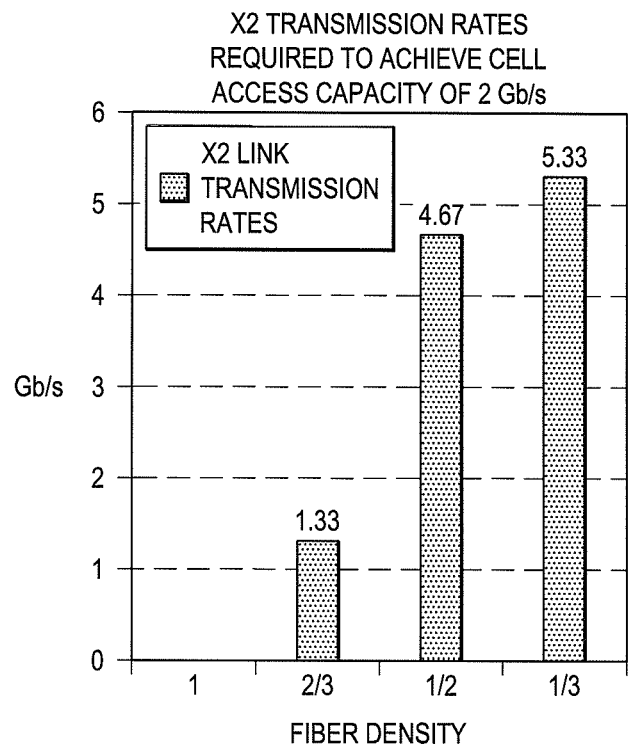
FIG. 34 illustrates an example bar chart evaluating X2 transmission rates that can be used to achieve an access capacity of 2 Gb/s for each U-eNB according to this disclosure.

FIG. 34 illustrates an example bar chart evaluating X2 transmission rates that can be used to achieve an access capacity of 2 Gb/s for each U-eNB according to this disclosure. Fiber densities of ⅓ and ⅔, as well as ½, can be considered. The backhauling schemes for fiber density ½ can also be based on Tx-3, Rx-3 schemes. For the fraction of time reserved for X2, α can be assumed to be its maximum value of 0.25. FIG. 34 also illustrates that an X2 transmission rate of 2-3 times the access capacity is sufficient to support a cell access capacity of 2 Gb/s. This can justify hardware reuse to achieve the desired X2 transmission rates since it can be reasonable to expect that the receive antenna gain at receiving peer eNBs will enable X2 link rates to achieve levels of twice or three times the cell access capacities.

Figure 35:
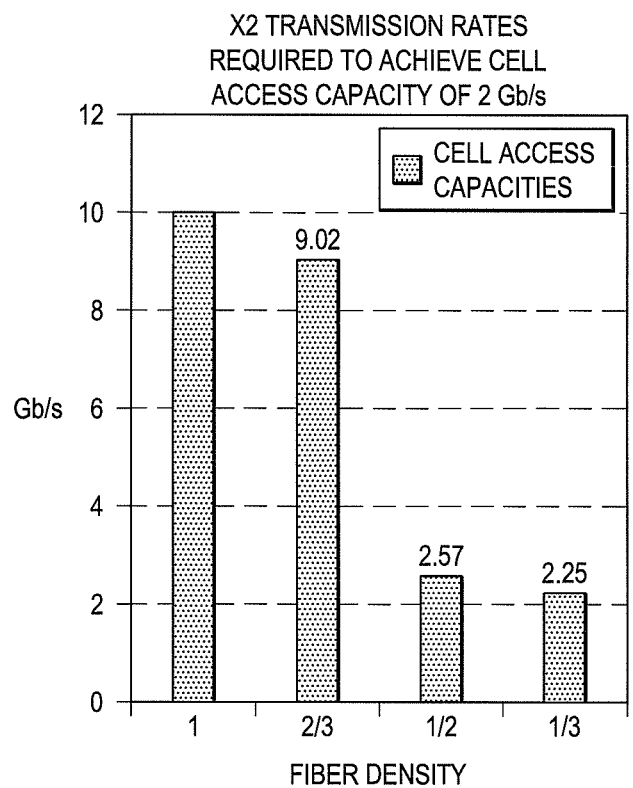
FIG. 35 illustrates an example plot of cell access capacities achievable when X2 transmission rates are fixed at 6 Gb/s according to this disclosure.

FIG. 35 illustrates an example plot of cell access capacities achievable when X2 transmission rates are fixed at 6 Gb/s according to this disclosure. For example, when the maximum fiber backhaul availability at a W-eNB is 10 Gb/s, the cell capacities can decrease as the fiber density decreases. However, when a fraction α of 0.25 is used, access capacities greater than 2 Gb/s can be supported even when only one in every three cells are fibered. Thus, the plots of FIG. 35 illustrate that in-band X2 can be used to transport backhaul without significantly hurting the cell access capacities. In some embodiments, due to the statistical multiplexing of user traffic, the fraction of a required can be 3-10 times smaller.

In some embodiments, various functions described above are implemented or supported by computer programs, each of which is formed from computer readable program code and embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

None of the description in this application should be read as implying that any particular element, step, or function is an essential element that must be included in the claim scope: the scope of patented subject matter is defined only by the claims. Moreover, none of these claims is intended to invoke paragraph six of 35 USC §112 unless the exact words "means for" are followed by a participle.

What is claimed is:

1. A communication system comprising:
a plurality of eNodeBs (eNBs) configured to serve one or more user equipments (UEs), the plurality of eNBs including a first eNB and a second eNB;
the first eNB configured to wirelessly communicate on a resource with the second eNB, the resource comprising at least one of a time resource or a frequency resource;
the first eNB and the second eNB configured to cooperatively serve the one or more UEs; and
the first eNB and the second eNB configured to engage in wireless communication following a predetermined schedule known to the plurality of eNBs,
wherein the resource comprises at least one of: one or more repeating frames or one or more repeating superframes,
wherein each frame comprises one or more subframes, the one or more subframes comprising contiguous or non-contiguous slots,
wherein the one or more repeating superframes have a lower frequency than the one or more repeating frames, and
wherein the predetermined schedule comprises recurring time intervals in every frame or every subframe.

2. The system of claim 1, wherein the first eNB and the second eNB are configured to cooperatively serve the one or more UEs by communicating data between a network and each of the one or more UEs through at least the first eNB and the second eNB.

3. The system of claim 2, wherein the data comprises forwarding/relaying data.

4. The system of claim 1, further comprising:
a third eNB of the plurality of eNBs, wherein the first eNB, the second eNB, and the third eNB are configured to wirelessly communicate with one another.

5. The system of claim 1, wherein the first eNB and the second eNB are configured to exchange at least one of user data or one or more control messages.

6. The system of claim 5, wherein the first eNB and the second eNB are configured to exchange the one or more control messages, and wherein the one or more control messages comprise (i) an interference reduction message configured to indicate a channel quality between a UE and at least one of the first eNB and the second eNB and (ii) UE scheduling information based on the interference reduction message.

7. The system of claim 5, wherein the first eNB and the second eNB are configured to exchange the one or more control messages, and wherein the one or more control messages comprise eNB power-down information indicating a sleep mode for at least one of the eNBs or a low duty cycle mode for at least one of the eNBs.

8. The system of claim 1, wherein the first eNB and the second eNB are configured to engage in wireless communication in a time division multiplex manner.

9. A method for use in a communication system having a plurality of eNodeBs (eNBs) comprising a first eNB and a second eNB, the method comprising:
receiving, by the plurality of eNBs, a predetermined schedule for wireless data communication between at least the first eNB and the second eNB; and wirelessly communicating data between the first eNB and the second eNB over a resource based on the predetermined schedule, wherein the resource comprises at least one of a time resource or a frequency resource and comprises at least one of: one or more repeating frames or one or more repeating superframes, wherein at least the first eNB and the second eNB are configured to cooperatively serve one or more user equipments (UEs), wherein each frame comprises one or more subframes, the one or more subframes comprising contiguous or non-contiguous slots, wherein the one or more repeating superframes have a lower frequency than the one or more repeating frames, and wherein the predetermined schedule comprises recurring time intervals in every frame or every subframe.

10. The method of claim 9, further comprising cooperatively serving, by the first eNB and the second eNB, the one or more UEs, wherein cooperatively serving comprises wirelessly communicating data between a network and each of the one or more UEs through at least the first eNB and the second eNB.

11. The method of claim 9, further comprising wirelessly communicating data between the first eNB, the second eNB, and a third eNB.

12. The method of claim 9, further comprising engaging, by the first eNB and second eNB, in wireless communication in a time division multiplex manner.

13. An apparatus comprising:
an eNodeB (eNB) comprising:
one or more wireless transceivers configured to wirelessly communicate with one or more other eNBs via one or more antennas; and
processing circuitry configured to cooperatively serve one or more user equipments (UEs) with the one or more other eNBs and configured to allow the eNB to wirelessly communicate on a resource with the one or more other eNBs following a predetermined schedule known to the eNB, wherein the resource comprises at least one of a time resource or a frequency resource,
wherein the resource comprises at least one of: one or more repeating frames or one or more repeating superframes, wherein each frame comprises one or more subframes, the one or more subframes comprising contiguous or non-contiguous slots, and wherein the one or more repeating superframes have a lower frequency than the one or more repeating frames.

14. The apparatus of claim 13, wherein the processing circuitry is configured to cooperatively serve the one or more UEs with the one or more other eNBs by communicating data between a network and each of the one or more UEs through the eNB.

15. The apparatus of claim 14, wherein the data comprises forwarding/relaying data.

16. The apparatus of claim 13, wherein the predetermined schedule comprises recurring time intervals in every frame or every subframe.

17. The apparatus of claim 13, wherein the eNB is configured to engage in wireless communication in a time division multiplex manner.

* * * * *